United States Patent
Cao et al.

(10) Patent No.: US 11,277,819 B2
(45) Date of Patent: *Mar. 15, 2022

(54) METHOD AND APPARATUS FOR SIDELINK TRANSMISSION AND RESOURCE ALLOCATION

(71) Applicant: Huawei Technologies Co., Ltd., Shenzhen (CN)

(72) Inventors: Yu Cao, Kanata (CA); Amine Maaref, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,227

(22) Filed: Jan. 17, 2020

(65) Prior Publication Data

US 2020/0236656 A1 Jul. 23, 2020

Related U.S. Application Data

(60) Provisional application No. 62/795,000, filed on Jan. 21, 2019.

(51) Int. Cl.
*H04W 72/02* (2009.01)
*H04W 76/27* (2018.01)
(Continued)

(52) U.S. Cl.
CPC ............ *H04W 72/02* (2013.01); *H04W 76/11* (2018.02); *H04W 76/27* (2018.02); *H04W 80/02* (2013.01); *H04W 92/18* (2013.01)

(58) Field of Classification Search
CPC ..... H04W 72/02; H04W 76/27; H04W 80/02; H04W 76/11; H04W 92/18; H04W 4/40; H04W 76/14; H04W 72/042
See application file for complete search history.

(56) References Cited

U.S. PATENT DOCUMENTS

| RE48,374 E | 12/2020 | Vandenameele et al. |
| 2014/0177564 A1 | 6/2014 | Ma et al. |

(Continued)

FOREIGN PATENT DOCUMENTS

| CN | 106162900 A | 11/2016 |
| CN | 107211430 A | 9/2017 |

(Continued)

OTHER PUBLICATIONS

3GPP TSG RAN WG1 Meeting #95; R1-1812399,Spokane, USA, Nov. 12-16, 2018, NPL_ R1-1812399,Source: Fraunhofer HHI, Fraunhofer IIS; Title:Designs for NR V2X Mode 2 Resource Allocation. (Year: 2018).*

(Continued)

*Primary Examiner* — Hassan A Phillips
*Assistant Examiner* — Mohammed S Chowdhury
(74) *Attorney, Agent, or Firm* — Slater Matsil, LLP

(57) ABSTRACT

Systems and methods of sidelink configuration, and sidelink transmission are provided. A base station transmits, and correspondingly a user equipment (UE) receives, a UE-specific radio resource control (RRC) signal for indicating a resource pool configuration and a sidelink configured grant (SL CG) configuration. The UE transmits a SL CG transmission using the transmission resource indicated by the SL CG configuration, without the UE receiving, in a downlink control information (DCI), a grant of transmission resources.

34 Claims, 19 Drawing Sheets

(51) Int. Cl.
    *H04W 80/02*   (2009.01)
    *H04W 76/11*   (2018.01)
    *H04W 92/18*   (2009.01)

(56) References Cited

U.S. PATENT DOCUMENTS

| | | |
|---|---|---|
| 2015/0382324 A1 | 12/2015 | Sheng et al. |
| 2016/0037512 A1 | 2/2016 | Lei |
| 2016/0112996 A1 | 4/2016 | Ou et al. |
| 2016/0183276 A1 | 6/2016 | Marinier et al. |
| 2016/0338094 A1 | 11/2016 | Faurie et al. |
| 2016/0338095 A1 | 11/2016 | Faurie et al. |
| 2017/0019910 A1 | 1/2017 | Seo |
| 2017/0041971 A1 | 2/2017 | Kim et al. |
| 2017/0188391 A1 | 6/2017 | Rajagopal et al. |
| 2017/0245313 A1 | 8/2017 | Kim et al. |
| 2017/0251478 A1 | 8/2017 | Kim et al. |
| 2017/0359835 A1 | 12/2017 | Seo et al. |
| 2018/0062809 A1* | 3/2018 | Baghel ............... H04L 1/0061 |
| 2018/0098322 A1 | 4/2018 | Yoon |
| 2018/0139724 A1* | 5/2018 | Loehr ............... H04W 72/02 |
| 2018/0213549 A1 | 7/2018 | Kim et al. |
| 2018/0220481 A1 | 8/2018 | Seo et al. |
| 2018/0234998 A1 | 8/2018 | You et al. |
| 2018/0270796 A1 | 9/2018 | Chae et al. |
| 2019/0069200 A1 | 2/2019 | Zhang et al. |
| 2019/0090250 A1 | 3/2019 | Lee et al. |
| 2019/0159174 A1 | 5/2019 | Seo |
| 2019/0174530 A1 | 6/2019 | Kim et al. |
| 2019/0342910 A1 | 11/2019 | Cao et al. |
| 2020/0029318 A1* | 1/2020 | Guo ............... H04L 1/1819 |
| 2020/0045674 A1* | 2/2020 | Tseng ............... H04W 72/04 |
| 2020/0053835 A1* | 2/2020 | Ye ............... H04L 1/08 |
| 2020/0107236 A1* | 4/2020 | Tseng ............... H04W 4/50 |
| 2020/0229145 A1* | 7/2020 | Kang ............... H04W 72/042 |

FOREIGN PATENT DOCUMENTS

| | | |
|---|---|---|
| CN | 107277922 A | 10/2017 |
| CN | 107710705 A | 2/2018 |
| CN | 107852727 A | 3/2018 |
| CN | 109156037 A | 1/2019 |
| WO | 2017176088 A1 | 10/2017 |
| WO | 2018004323 A1 | 1/2018 |

OTHER PUBLICATIONS

3GPP TSG-RAN WG1 Meeting #94-Bis; Tdoc R1-1811594; Source: Ericsson, Title: On Mode 2 Resource Allocation for NR Sidelink, Chengdu, China, Oct. 8-12, 2018. (Year: 2018).*
3GPP TSG RAN WG1 Meeting #94bis ; R1-1810283; Source: LG Electronics, Title: Discussion on sidelink resource allocation mechanism, Chengdu, China, Oct. 8-12, 2018. (Year: 2018).*
3GPP TSG RAN WG1 Meeting #94bis,R1-1811904:'Sidelink resource allocation mechanism for NR V2X', Huawei, HiSilicon, Chengdu, China, Oct. 8-12, 2018, total 13 pages.
3GPP TSG-RAN WG2 Meeting #95,R2-165839:"Supportfor V2V services based on LTE sidelink",LG Electronics Inc., Gothenburg, Sweden, Aug. 22-26, 2016, total 20 pages.
Final Report of 3GPP TSG RAN WG1 #95 v1.0.0, (Spokane, USA, Nov. 12-16, 2018), 3GPP TSG RAN WG1 Meeting #96, R1-1901482, Athens, Greece, Feb. 25-Mar. 1, 2019.
Huawei, et al., Discussion on sidelink resource allocation and configuration, 3GPP TSG RAN WG1 Meeting #90, R1-1712135, Aug. 21-25, 2017, 6 Pages, Prague, Czech Republic.
Huawei, et al., "Discussion on V2V resource pool configuration", 3GPP TSG-RAN WG4 Meeting #82, R4-1701116, Feb. 13-17, 2017, 3 Pages, Athens, Greece.
Interdigital Communications, "Multiple concurrent destination within a scheduling period", 3GPP TSG-RAN WG2 #92, R2-156699, Nov. 15-22, 2015, 3 Pages, Anaheim, California.
Ericsson, "Contents of PSCCH for V2V over PC5", 3GPP TSG RAN WG1 Meeting #86, R1-167011, Aug. 22-26, 2016, 4 Pages, Gothenburg, Sweden.
Huawei, et al., "UE autonomous sidelink allocation for NR V2X", 3GPP TSG RAN WG1 Meeting #94, R1-1808939, Aug. 20-24, 2018, 6 Pages, Gothenburg, Sweden.
"3rd Generation Partnership Project; Technical Specification Group Radio Access Network; NR; Physical layer procedures for control, (Release 15)", 3GPP TS 38.213 V15.4.0, Technical Specification, Dec. 2018, 104 Pages.
"3rd Generation Partnership Project; Technical Specification Group Radio Access Network; NR; Radio Resource Control (RRC) protocol specification, (Release 15)", 3GPP TS 38.331 V15.4.0, Technical Specification, Dec. 2018, 474 Pages.
"3rd Generation Partnership Project; Technical Specification Group Radio Access Network; NR; Physical layer procedures for data, (Release 15)", 3GPP TS 38.214 V15.4.0, Technical Specification, Dec. 2018, 102 Pages.
Intel Corporation, "Summary for NR-V2X AI—7.2.4.1.4 Resource Allocation Mechanism", 3GPP TSG RAN WG1 Meeting #95, R1-1814260, Nov. 12-16, 2018, 14 Pages, Spokane, USA.
Intel Corporation, "Summary for NR-V2X AI—7.2.4.1.4 Resource Allocation Mechanism", 3GPP TSG RAN WG1 Meeting #95, R1-1813908, Nov. 12-16, 2018, 14 Pages, Spokane, USA.
Intel Corporation, "Summary for NR-V2X AI—7.2.4.1.4 Resource Allocation Mechanism", 3GPP TSG RAN WG1 Meeting #95, R1-1814260, Nov. 12-16, 2018, 12 Pages, Spokane, USA.
Intel Corporation, "On UL grant free transmissions", 3GPP TSG RAN WG1 Meeting #89, R1-1707407, May 15-19, 2017, 7 Pages, Hangzhou, P.R. China.
NEC, "On network resources and UE transmission configurations for grant-free access", 3GPP TSG RAN WG1 NR Ad-Hoc Meeting #02, R1-1710963, Jun. 27-30, 2017, 4 Pages, Qingdao, China.

* cited by examiner

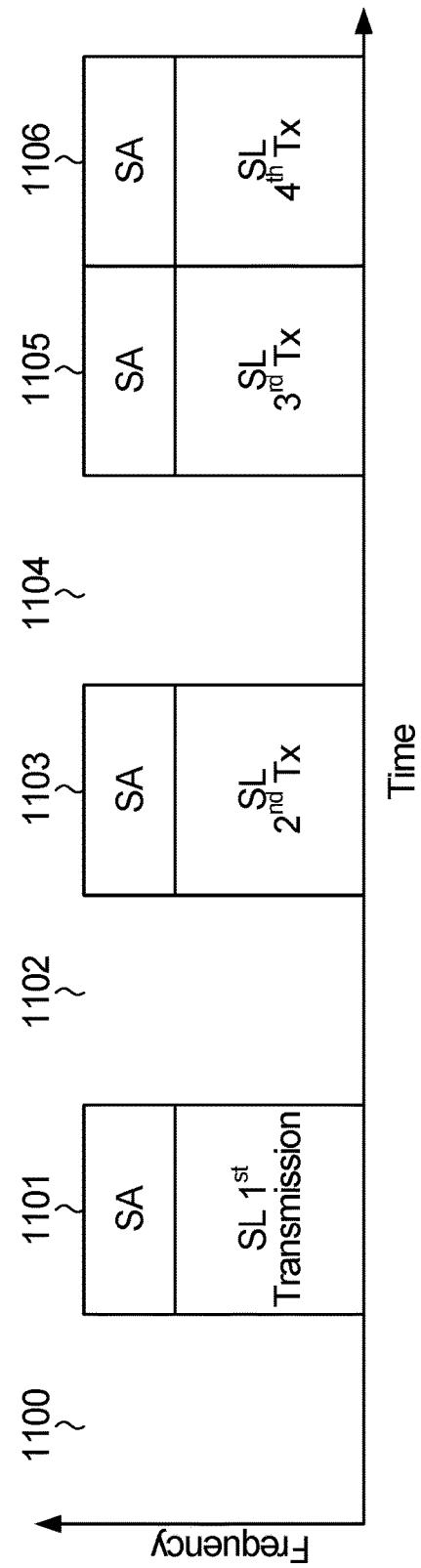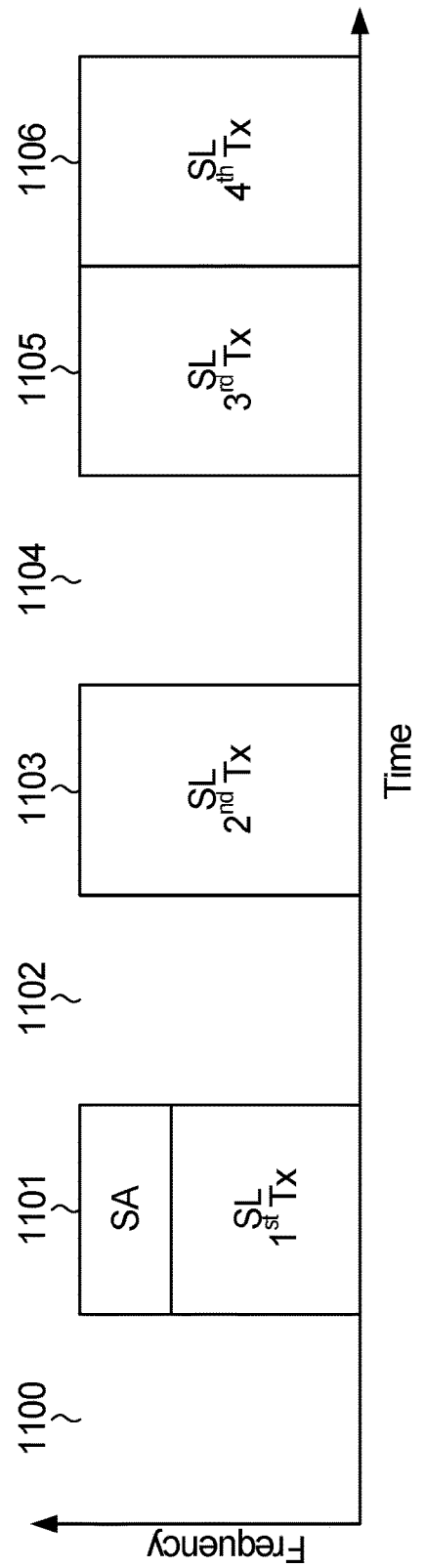

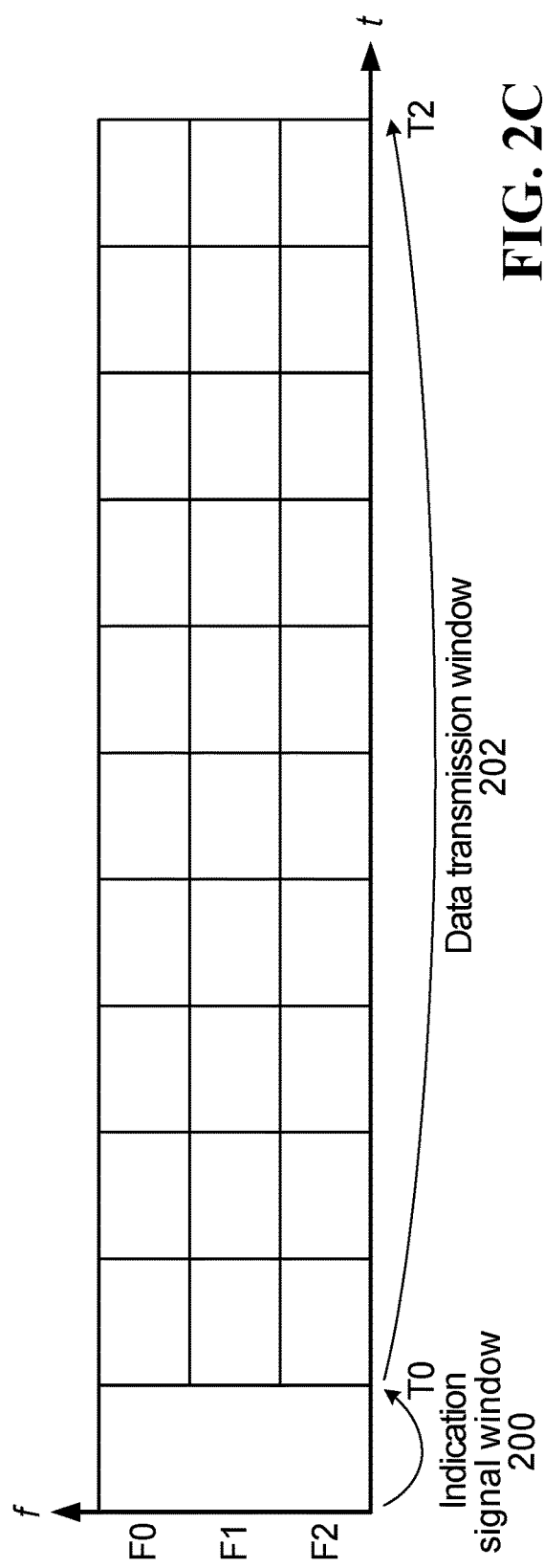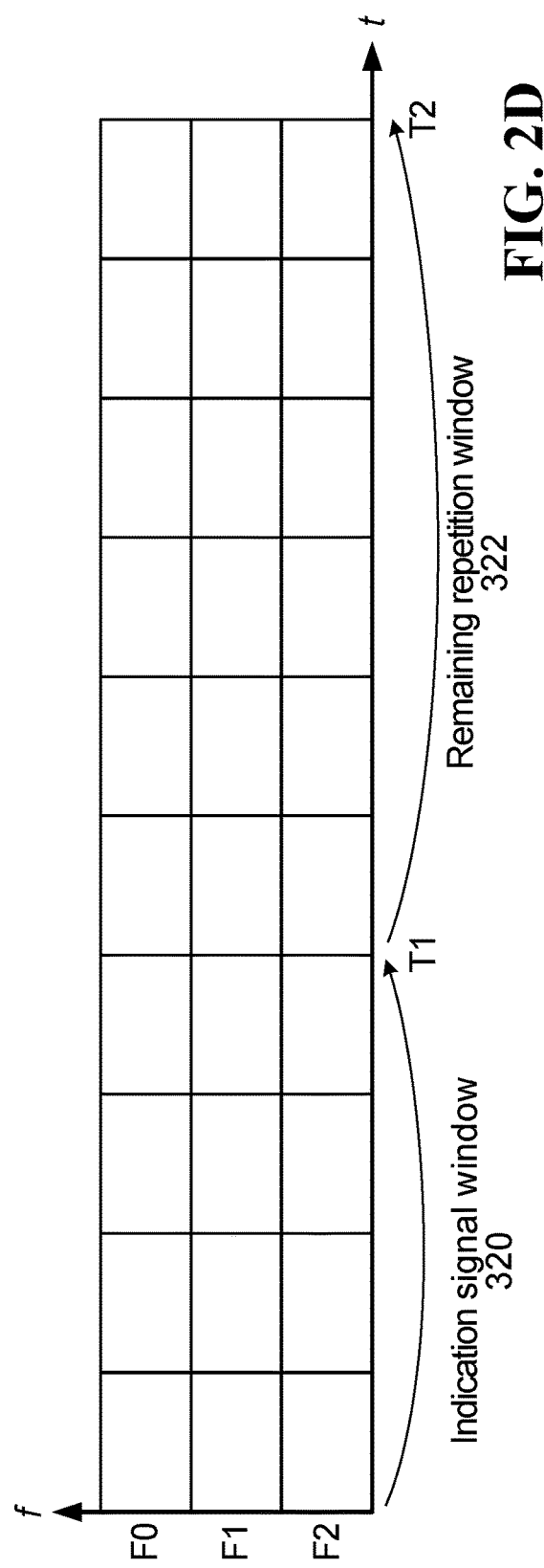

METHOD AND APPARATUS FOR SIDELINK TRANSMISSION AND RESOURCE ALLOCATION

CROSS REFERENCE TO RELATED APPLICATION

This application claims the benefit of U.S. Provisional Patent Application No. 62/795,000 filed Jan. 21, 2019, which is hereby incorporated by reference in its entirety.

FIELD

The application relates to methods and apparatus for sidelink transmission and resource allocation.

BACKGROUND

LTE V2X:

Vehicle to everything (V2X) refers to a category of communications scenarios (along with their corresponding technical challenges), including communication between a vehicle and another vehicle (V2V), vehicle to infrastructure (V2I), vehicle to pedestrian (V2P), and many other scenarios. In V2X, the transmission can be done through a link between network and UE, such as uplink (UL) and downlink (DL) or a sidelink between UE and UE (SL). UE cooperation can be used to enhance the reliability, throughput, and capacity of V2X communications, as well as next generation wireless communications in general.

In Long Term Evolution (LTE), a conventional V2X transmission scheme relies on the concept of a transmit resource pool (RP). The conventional LTE V2X transmission scheme includes two transmission modes: mode 3 and mode 4. In mode 3, a base station (BS) schedules time-frequency resources (from the UE's RP) for SL transmission using downlink control information (DCI), either dynamically or semi-persistently. In mode 4, UE randomly selects resources within its transmit RP. A UE may also reselect resources based on previous measurement and sensing results.

The conventional resource pool approach has downsides and limitations. For example, the scheduling in mode 3 results in scheduling-related limitations, such as latency and having the SL transmission rely on DCI. For another example, when the UE autonomously selects resources in mode 4, there can be a collision or conflict with the same resource being selected by another UE.

NR-V2X: In New Radio (NR) Release16, the following agreement has been reached for Mode 2 grant free transmission (denoted as Mode-2c):

For out of coverage operation, Mode-2(c) assumes (pre)-configuration of single or multiple sidelink transmission patterns (patterns are defined on each sidelink resource pool);

For in-coverage operation, Mode-2(c) assumes that gNB configuration indicates single or multiple sidelink transmission patterns (patterns are defined on each sidelink resource pool);

If a single pattern is configured to a transmitting UE there is no sensing procedure executed by the UE;

If multiple patterns are configured to a transmitting UE there is a possibility of a sensing procedure executed by the UE;

Pattern is defined in terms of the size of the resource in time and frequency, Position(s) of the resource in time and frequency, and the number of resources; and NR's UL grant-free transmission is called "configured grant UL transmission" or "UL transmission without dynamic scheduling." It includes two types. For configured grant Type 1, a resource is configured by radio resource control (RRC) signaling. For configured grant Type 2, a resource is configured by a combination of RRC signaling and DCI signaling. NR UL Configured grant type 1 transmission is mainly used for uplink transmission, which means the base station that configured the resource is also the receiver. Therefore, the receiver (the BS) knows all the configuration of the configured grant UE.

SUMMARY

According to one aspect of the present disclosure, there is provided a method comprising: receiving, by a first user equipment (UE), a UE-specific radio resource control (RRC) signal for indicating a resource pool configuration and a sidelink configured grant (SL CG) configuration, the resource pool configuration comprising an indication of a plurality of transmission resources available for SL transmissions, and the SL CG configuration comprising an indication of a transmission resource from the plurality of transmission resources, the transmission resource for communicating a SL CG transmission between the first UE and a second UE; and transmitting, by the first UE, the SL CG transmission to the second UE using the transmission resource indicated by the SL CG configuration, without the first UE receiving, in a downlink control information (DCI), a grant of transmission resources.

Optionally, the transmission resource for communicating the SL CG transmission comprises a SL control channel resource and a SL data channel resource, and wherein transmitting the SL CG transmission comprises transmitting SL control information using the SL control channel resource and transmitting SL data using the SL data channel resource.

Optionally, the SL CG configuration further comprises and indication of a periodicity of the transmission resource.

Optionally, the resource pool configuration further comprises an indication of a number of resource blocks (RBs) in a frequency sub-channel of the transmission resource.

Optionally, the SL CG configuration is a first SL CG configuration in the resource pool configuration, and the resource pool configuration further comprises a second SL CG configuration, and wherein the method further comprises: transmitting, by the first UE, a second SL CG transmission to the second UE or a third UE using a second transmission resource indicated by the second SL CG configuration, without the first UE receiving, in the DCI, a grant of transmission resources.

Optionally, the SL CG configuration further comprises an indication of a feedback channel parameter associated with the transmission resource.

According to another aspect of the present disclosure, there is provided a method comprising: transmitting, by a base station, a user equipment (UE)-specific radio resource control (RRC) signal to a first UE, the UE-specific RRC signal for indicating a resource pool configuration and a sidelink configured grant (SL CG) configuration, the resource pool configuration comprising an indication of a plurality of transmission resources available for SL transmissions, and the SL CG configuration comprising an indication of a transmission resource from the plurality of transmission resources, the transmission resource for communicating a SL CG transmission between the first UE and a second UE without the first UE receiving, in a downlink control information (DCI), a grant of transmission resources.

Optionally, the transmission resource for communicating the SL CG transmission comprises a SL control channel resource and a SL data channel resource, and wherein the transmission resource for communicating the SL CG transmission between the first UE and the second UE is for transmitting SL control information using the SL control channel resource and transmitting SL data using the SL data channel resource.

Optionally, the SL CG configuration further comprises and indication of a periodicity of the transmission resource.

Optionally, the resource pool configuration further comprises an indication of a number of resource blocks (RBs) in a frequency sub-channel of the transmission resource.

Optionally, the SL CG configuration is a first SL CG configuration in the resource pool configuration, and the resource pool configuration further comprises a second SL CG configuration for use in transmitting, by the first UE, a second SL CG transmission to the second UE or a third UE using a second transmission resource indicated by the second SL CG configuration, without the first UE receiving, in the DCI, a grant of transmission resources.

Optionally, the SL CG configuration further comprises an indication of a feedback channel parameter associated with the transmission resource.

According to another aspect of the present disclosure, there is provided a method comprising: receiving, by a first user equipment (UE), a sidelink configured grant (SL CG) transmission from a second UE, using a transmission resource indicated by a SL CG configuration, without the second UE receiving, in a downlink control information (DCI), a grant of transmission resources, wherein the SL CG configuration is included in a UE-specific radio resource control (RRC) signal for indicating a resource pool configuration, the resource pool configuration comprising an indication of a plurality of transmission resources available for SL transmissions, and the SL CG configuration indicates the transmission resource from the plurality of transmission resources.

According to another aspect of the present disclosure, there is provided a method comprising: transmitting, by a first user equipment (UE), a sidelink (SL) control information to a second UE identified by a destination identifier, the SL control information comprising an indication of a SL transmission resource and a partial version of the destination identifier; and transmitting, by the first UE, a SL transmission to the second UE using the SL transmission resource indicated by the SL control information.

Optionally, the SL transmission is a SL configured grant (CG) transmission.

Optionally, the destination identifier is further included in a MAC header of the SL transmission.

According to another aspect of the present disclosure, there is provided a user equipment (UE) comprising: a processor and memory, the UE configured to perform a method comprising: receiving, by the user equipment (UE), a UE-specific radio resource control (RRC) signal for indicating a resource pool configuration and a sidelink configured grant (SL CG) configuration, the resource pool configuration comprising an indication of a plurality of transmission resources available for SL transmissions, and the SL CG configuration comprising an indication of a transmission resource from the plurality of transmission resources, the transmission resource for communicating a SL CG transmission between the UE and a second UE; and transmitting, by the UE, the SL CG transmission to the second UE using the transmission resource indicated by the SL CG configuration, without the UE receiving, in a downlink control information (DCI), a grant of transmission resources.

Optionally, the transmission resource for communicating the SL CG transmission comprises a SL control channel resource and a SL data channel resource, and wherein transmitting the SL CG transmission comprises transmitting SL control information using the SL control channel resource and transmitting SL data using the SL data channel resource.

Optionally, the SL CG configuration further comprises and indication of a periodicity of the transmission resource.

Optionally, the resource pool configuration further comprises an indication of a number of resource blocks (RBs) in a frequency sub-channel of the transmission resource.

Optionally, the SL CG configuration is a first SL CG configuration in the resource pool configuration, and the resource pool configuration further comprises a second SL CG configuration, and wherein the user equipment further comprises: transmitting, by the first UE, a second SL CG transmission to the second UE or a third UE using a second transmission resource indicated by the second SL CG configuration, without the first UE receiving, in the DCI, a grant of transmission resources.

Optionally, the SL CG configuration further comprises an indication of a feedback channel parameter associated with the transmission resource.

According to another aspect of the present disclosure, there is provided a base station comprising: a processor and memory, the base station configured to perform a method comprising: transmitting, by the base station, a user equipment (UE)-specific radio resource control (RRC) signal to a first UE, the UE-specific RRC signal for indicating a resource pool configuration and a sidelink configured grant (SL CG) configuration, the resource pool configuration comprising an indication of a plurality of transmission resources available for SL transmissions, and the SL CG configuration comprising an indication of a transmission resource from the plurality of transmission resources, the transmission resource for communicating a SL CG transmission between the first UE and a second UE without the first UE receiving, in a downlink control information (DCI), a grant of transmission resources.

Optionally, the transmission resource for communicating the SL CG transmission comprises a SL control channel resource and a SL data channel resource, and wherein the transmission resource for communicating the SL CG transmission between the first UE and the second UE is for transmitting SL control information using the SL control channel resource and transmitting SL data using the SL data channel resource.

Optionally, the SL CG configuration further comprises and indication of a periodicity of the transmission resource.

Optionally, the resource pool configuration further comprises an indication of a number of resource blocks (RBs) in a frequency sub-channel of the transmission resource.

Optionally, the SL CG configuration is a first SL CG configuration in the resource pool configuration, and the resource pool configuration further comprises a second SL CG configuration for use in transmitting, by the first UE, a second SL CG transmission to the second UE or a third UE using a second transmission resource indicated by the second SL CG configuration, without the first UE receiving, in the DCI, a grant of transmission resources.

Optionally, the SL CG configuration further comprises an indication of a feedback channel parameter associated with the transmission resource.

According to another aspect of the present disclosure, there is provided a user equipment comprising: a processor and memory, the user equipment configured to perform a method comprising: receiving, by the user equipment (UE), a sidelink configured grant (SL CG) transmission from a second UE, using a transmission resource indicated by a SL CG configuration, without the second UE receiving, in a downlink control information (DCI), a grant of transmission resources, wherein the SL CG configuration is included in a UE-specific radio resource control (RRC) signal for indicating a resource pool configuration, the resource pool configuration comprising an indication of a plurality of transmission resources available for SL transmissions, and the SL CG configuration indicates the transmission resource from the plurality of transmission resources.

According to another aspect of the present disclosure, there is provided a user equipment comprising: processor and memory, the user equipment configured to perform a method comprising: transmitting, by the user equipment (UE), a sidelink (SL) control information to a second UE identified by a destination identifier, the SL control information comprising an indication of a SL configured grant (CG) transmission resource and a partial version of the destination identifier; and transmitting, by the UE, a SL CG transmission to the second UE using the SL CG transmission resource indicated by the SL control information.

Optionally, the SL transmission is a SL configured grant (CG) transmission.

Optionally, the destination identifier is further included in a MAC header of the SL transmission.

According to one aspect of the present disclosure, there is provided a method for wireless communication, the method comprising: receiving, by a first UE, a demodulation reference signal (DMRS) from a second UE, the DMRS being one of the plurality of DMRSes, and being associated with one of a plurality of transmission patterns; and receiving, by the first UE, a data transmission from the second UE according to the transmission pattern associated with the received DMRS.

Optionally, the method further comprises: obtaining, by the first UE; a DMRS pool comprising the plurality of DMRSes; and obtaining, by the first UE; a transmission pattern pool comprising the plurality of transmission patterns.

Optionally, the method further comprises: obtaining, by the first UE; a sidelink configuration comprising the association between the transmission pattern and the received DMRS.

Optionally, the DMRS is further associated with one of a plurality of modulation and coding schemes (MCS), and the method further comprising: receiving the data transmission according to the MCS associated with the received DMRS.

According to another aspect of the present disclosure, there is provided a method for wireless communication, the method comprising: receiving, by a first UE, a sidelink control information (SCI) from a second UE, the SCI comprising an identifier of the second UE, the identifier being associated with one of a plurality of transmission patterns; and receiving, by the first UE, a data transmission from the second UE according to the transmission pattern associated with the received identifier.

Optionally, the method further comprises: obtaining, by the first UE; a sidelink configuration comprising the association between the transmission pattern and the identifier of the second UE.

Optionally, the sidelink configuration further comprises an association with a modulation and coding scheme (MCS).

According to another aspect of the present disclosure, there is provided a method for wireless communication, the method comprising: receiving, by a first UE, sidelink information between the first UE and the second UE; receiving, by the first UE, a sidelink configuration from a base station, the sidelink configuration for configuring both the first UE and the second UE according to the sidelink information; and transmitting, by the first UE to the second UE, without a dynamic grant of transmission resources by the base station, a data transmission using the received sidelink configuration.

According to another aspect of the present disclosure, there is provided a method for wireless communication, the method comprising: receiving, by a first UE, sidelink information between the first UE and the second UE; receiving, by the first UE, a sidelink configuration from a base station, the sidelink configuration for configuring both the first UE and the second UE according to the sidelink information; and receiving, by the first UE from the second UE, without a dynamic grant of transmission resources by the base station, a data transmission using the received sidelink configuration.

Optionally, transmitting or receiving the data transmission is performed without dynamic indication of transmission resources in a sidelink control channel.

According to another aspect of the present disclosure, there is provided a user equipment comprising a processor and memory and at least one antenna, the UE configured to perform the method as described herein.

BRIEF DESCRIPTION OF THE DRAWINGS

Embodiments of the disclosure will now be described with reference to the attached drawings in which:

FIG. 2A is a plot illustrating an example of a configuration of an SA;

FIG. 2B is another plot illustrating an example of a configuration of an SA;

FIG. 2C is an example of a specific window defined for advanced transmission of transmission pattern indication signal;

FIG. 2D is an example of a specific window for initial transmissions and another window for remaining repetitions;

DETAILED DESCRIPTION

Figure 1A:
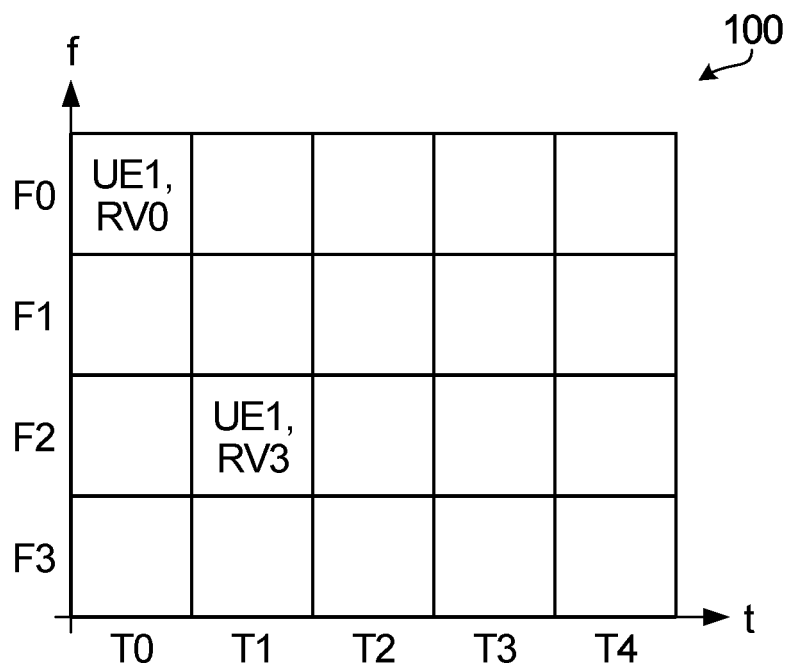
FIG. 1A is a block diagram illustrating an example of a two-dimensional resource configuration for grant-free SL transmission.

In V2X SL, both the transmitter and receiver are UEs, therefore, the receiver would not be able to know the transmitter UE's configurations, such as who is transmitting, who is the data targeting to, what is the time/frequency resource used for the transmission and all the control information etc.

In SL GF transmission, there is no dynamic signaling needed for SL transmission. In this case, SCI does not need to include the scheduling information, such as time frequency domain resources, modulation and coding scheme (MCS) etc. In some SL transmission mechanisms, a UE always first decodes SCI, and then uses the information included in the SCI to decode the SL data transmission. A problem is now how does the UE decode the SL transmission if the SCI does not include the scheduling information.

In NR, there are two SL transmission modes. In mode 1, the BS controls SL transmission. In mode 2, the UE determines or selects a resource among a resource pool. Mode 1 may include a dynamic scheduling mode, Configured grant Type 1 and Configured grant Type 2. Configured grant Type 1 is a type of grant-free transmission. All the method described in this disclosure that is applied to GF transmission can be applied to configured grant transmission.

In Mode 1 GF transmission mode, a GF resource is configured by RRC signaling (or RRC configured grant, or configured grant Type 1) with dynamic grant or dynamic scheduling from the BS. The UE uses the configured resource without dynamic signaling (e.g. DCI) to perform a SL transmission. Mode 1 is most suitable for in coverage UE. In Mode 2 GF transmission, the GF resource may be preconfigured or configured by RRC or system information. Mode 2 GF can also be considered Mode 2 configured grant transmission. Mode 2 GF can be used for both in coverage and out of coverage UEs. For out of coverage operation, Mode 2 GF transmission assumes (pre)-configuration of single or multiple sidelink transmission patterns (patterns are defined on each sidelink resource pool). For in-coverage operation, Mode 2 GF assumes that gNB configuration indicates single or multiple sidelink transmission patterns (patterns are defined on each sidelink resource pool). If a single pattern is configured to a transmitting UE there is no sensing procedure executed by the UE. If multiple patterns are configured to the transmitting UE there is a possibility of sensing procedure executed by the UE. Patterns are defined in terms of Size of the resource in time and frequency, Position(s) of the resource in time and Number of resources.

Methods of configuring resources for GF transmission are provided by an embodiment of the disclosure. These methods may be applied to GF transmission or GF transmission mode in SL Mode 1 and/or Mode 2. SL grant-free transmission is some time also called configured grant transmission. These methods may be also applied to configured grant transmission in SL Mode 1 and/or Mode 2. Alternatively, these methods may be applied to SL transmission in general, not limited to SL GF transmission in Mode 1 and/or Mode 2.

With the provided methods, the time frequency resources and other transmission parameters, such as MCS, are not included in the SCI. Rather, the UE may rely on other semi-static configuration or blind detection to obtain the transmission parameters and decode the data. The UE does not rely on any dynamic scheduling information to indicate a transmission resource. The UE also does not rely on SCI for time frequency resource, MCS and other parameters related to scheduling.

Generally, sidelink GF resource configuration involves the configuration of one or more parameters for sidelink GF transmission or reception. This can involve the use of (selection from within and/or configuration of) pools to define possible values for individual parameters or sets of parameters.

GF resource configuration may be performed on a UE specific basis, where the configuration is applicable to a specific UE, or on a group common basis, where the configuration is applicable to multiple UEs.

In some embodiments, GF resource configuration involves the use of (UE specific or group common) radio resource control (RRC) signaling. In some embodiments, GF resource configuration involves the use of system information, transmitted in system information blocks (SIBs), that is defined to be common for all UEs.

In some embodiments, GF resource configuration of one or more parameters for GF transmission or reception involves configuring one or more parameters for use while a UE is within network coverage.

In some embodiments, GF resource configuration of one or more parameters for GF transmission or reception involves preconfiguring one or more parameters for use by a UE which can be used when a UE goes out of network coverage. Preconfiguration may involve preconfiguration without signaling from gNB or preconfiguration using gNB signaling while in-coverage, which may be kept and used for out-of-coverage operation, the latter including UE-specific preconfiguration for example via RRC signaling, or a common pre-configuration, for example via system information.

In some embodiments, the preconfigured SL configuration comprises any one of the following: an SL configuration preconfigured in the communication terminal prior to deployment of the communication terminal; an SL configuration preconfigured in the communication terminal other than by higher-layer signaling; an SL configuration preconfigured in the communication terminal by a network entity in the communication network prior to the communication terminal becoming out of coverage; an SL configuration forwarded to the communication terminal directly by another communication terminal; and a common or initial SL configuration preconfigured in the communication terminal. The following are examples of possible ways to preconfigure the SL resources:

First Example: the SL resources are preconfigured in the UE by the manufacture.

Second Example: The SL resources are preconfigured/reconfigured by a V2X control entity. Third Example: The SL resources are preconfigured by gNB using higher-layer signaling. UE uses the preconfigured SL resource(s)/resource pool(s) after transitioning from in-coverage to out-of-coverage. The Higher-layer signaling can be cell-specific (e.g. SIBx) or UE-specific.

Fourth Example: A UE (UE A) may receive pre-configuration information from another UE (UE B) through a SL transmission. UE B may receive the pre-configuration information from gNB (through UE-specific or cell-specific signaling) or from another UE (UE C);

Fifth Example: A common/initial SL resource/resource pool(s) is configured in SIBx. A UE keeps the initial/common SL resource/resource pool(s) when transitioning from in-coverage to out-of-coverage. The UE uses the common/initial SL resource/resource pool(s) as the preconfigured SL resource/resource pool(s) after transitioning from in-coverage to out-of-coverage.

In some embodiments, a GF resource configuration involves indicating a resource from a resource pool that is configured or pre-configured. Alternatively, GF resource configuration involves configuring a resource pool from which the UE can select from. The resource pool configuration may be also used to define a resource pool for other transmission modes or just an independent GF resource configuration.

A resource pool refers to a pool of transmission resources that a UE can use or select from. A resource pool typically includes at least the time and frequency resources. Resource pool can include other transmission resources.

In one example, there are multiple resource pool (RP) configurations, which may be configured per SL bandwidth part (BWP). Each resource pool may be a transmit resource pool or a receive resource pool. For each RP, there may be a GF configuration defined within the RP, there may be other transmission modes defined within the RP as well. In another example, there are multiple GF resource configurations, which may be configured per SL BWP. For each GF configuration, there may be one or multiple resource pools defined, each resource pool can be a transmit resource pool or receive resource pool. In some scenarios, the resource configuration for each GF configuration may not be called a resource pool or within a resource pool, it may be simply a resource configuration.

In some embodiments, a UE is configured with multiple GF resource configurations, which may be defined within multiple SL bandwidth parts (BWPs). SL BWPs may be configured within RRC configuration (UE specific SL BWP), in system information (common SL BWP) or pre-configuration (preconfigured SL BWP). In some embodiments, a UE reuses one or more UL BWPs as SL BWPs.

In some embodiments, a UE may have multiple resource pool configurations and/or multiple GF resource configurations. Multiple transmit and receive resource pool configurations and/or multiple GF resource configurations may be configured per SL-BWP.

In some embodiments, multiple GF resource configurations may be configured within resource pool configurations. In some embodiments, multiple transmit and receive resource pools may be configured within GF resource configurations.

In some embodiments, multiple GF resource configurations may be independent of resource pool configurations.

Each GF configuration may include one or more of transmit resource or resource pool and receive resource or resource pool. The configuration can be semi-static or semi-persistently configured, the example of configuration signaling can include RRC, system information block (SIB), preconfigured, or a combination of RRC and SIB.

Each GF resource configuration may include parameters for one or multiple transmit GF resource configurations and/or parameters for one or multiple receive GF resource configurations. Parameters for each transmit GF resource configuration may include one or multiple sets of parameters, each set including one or a combination of:

Time and frequency resources, periodicity, pattern window length, frequency sub-channel definition, location of SCI, (initial) transmission pattern and/or transmission pattern pool, frequency hopping parameters, MCS or MCS pool, DMRS or DMRS pool, repetition K, HARQ process related parameters, feedback channel parameters and optionally Destination ID or destination group ID Parameters for each receive GF resource configuration may include one or multiple sets of parameters, each set including one or a combination of:

Time and frequency resources, periodicity, pattern window length, frequency sub-channel definition, location of SCI, (initial) transmission pattern and/or transmission pattern pool, frequency hopping parameters, MCS or MCS pool, DMRS or DMRS pool, repetition K, HARQ process related parameters, feedback channel parameters and optionally source ID or source group ID The time domain resource configuration may include optionally a periodicity, optionally an offset (also referred to as starting slot), transmission pattern, repetition number (K), RV sequence for repetition, and optionally length of the transmission pattern etc. Transmission pattern in the time domain may be indicated using a bitmap indicating which time slot can be used for the UE to transmit SL data.

The frequency domain resource configuration may include, for example, the active Bandwidth part (BWP) used for SL transmission and subchannels/Resource block group (RBG) of the BWP. In some embodiments, the frequency domain configuration may first indicate the starting RB of the first frequency sub-channel (RB_{start}), number of RBs per frequency sub-channel (N_{RB_in_subchannel}), and the total number of frequency sub-channels (n_{subchannel}) available for the SL transmission. The above parameters can be used to determine the range and partition of frequency subchannels. For example, in a resource grid as shown in FIG. 1A described in detail below, the above parameters (starting RB of F0, number of frequency sub-channels is 4 and the number of RBs per sub-channel is the number of RBs in F0) can define the frequency location and size for F0 to F4. The above parameters can be UE specifically indicated (e.g. in RRC) or can be broadcast in system information for multiple UEs. The frequency domain configuration may then indicate the index of the frequency subchannel m to be used for the transmission. UE may then determine its frequency allocation corresponds to the RB that starts at RB index RB_{start}+m*N_{RB_in_subchannel} and with n_{subchannel} number of continuous RBs to be use. In the case, a transmission pattern bitmap is determined in time domain and different subchannels may be used in frequency domain for different repetitions of the TB, the frequency domain configuration may further indicates the frequency index for each transmission/repetition of the TB. For example, in case of the example shown in FIG. 1A, F0 to F4 may corresponds index m as 0, 1, 2, 3, respectively, and the frequency domain resource configuration may indicate a frequency channel index sequence corresponding to each transmission of the TB, which is {0, 2}, corresponding to F0 and F2 for first and second transmission of the TB. In some embodiment, the resource assigned to each PSSCH transmission may include more than 1 subchannel in the frequency domain. In this scenario, in addition to indicating the above definition of subchannel, the resource configuration may further include the starting subchannel index and the number of subchannels used for each PSSCH transmission. The starting subchannel index and the number of subchannels used can be individually defined for each repetition. Alternatively, the number of subchannels used for each repetition may be the same and only the starting subchannel index need to be signaled for each repetition. In another embodiment, the starting subchannel index may be defined for just the initial transmission, the starting subchannel index for the rest of the repetition can be the same as the initial transmission or determined by the starting sub-channel index along with frequency hopping parameters or through frequency domain pattern indication.

If the SL control channel is defined, the time and frequency domain resource configuration for the SL control channel PSCCH (or scheduling assignment (SA)) may share the same above configuration for SL data channel or have their own separate configuration. In some embodiments, the resource configuration for an SA shares the parameters above with the data channel configuration, but has the following additional configurations, which may include starting symbol and length of a SA in terms of number of symbols, a time gap between SA and the corresponding data transmissions if SA and data transmission are in different slots (see, for example, FIGS. 2A and 2B described below), and the frequency-domain resource configuration of SA. For example, the frequency domain resource configuration of SA may include a starting frequency domain communication resource and a size of a SA in the frequency domain (e.g. in terms of resource blocks, the starting RB and the size of SA in number of RBs). There may be a parameter used to indicate whether the SA and data is in frequency division duplex (FDD) mode or time division duplex (TDD) mode and/or whether the SA and data are in different slots.

FIG. 2A is a plot illustrating an example of a configuration of an SA. FIG. 2A illustrates time slots 1100-1106 on a time-frequency resource grid. During four of those time slots 1101, 1103, 1105 and 1106, an SA transmission and an SL data transmission are performed. These transmissions may be performed, for example, in accordance with a transmission pattern.

In FIG. 2A, an SA is associated with each of the four SL transmissions in the time slots 1101, 1103, 1105 and 1106, which correspond to a transmission pattern {0101011} that is used as an example above. Each SA may indicate the transmission pattern and resources used for each SL data transmission of time slots 1101, 1103, 1105 and 1106 (may include both time domain and frequency domain configuration described earlier). An SA may also include the number of transmissions, and the RV sequence associated with the transmissions. Each SA may also indicate the starting location of the transmission pattern or the time location of the transmission associated with this SA (the indication can be actual time location or relative time location to the SA). In the case of an SA and its associated SL transmission being frequency division duplexed (FDDed) as in FIG. 2A or otherwise combined in the same time unit, the time location of the associated SL transmission may be derived from the time location of the SA. Additionally, the SAs may indicate other information associated with the transmissions of SL data such as the RV for each SL transmission and/or the RV for its associated transmission. An SA may also indicate which transmission of the TB and/or RV for this transmission. For example, the SA in slot 1101 may indicate that this is the first transmission of the TB and it may also indicate the RV that is associated with this TB. Alternatively, each SA may only include the transmission pattern and resources used for the SL transmission for the associated transmission. For example, the SA transmission associated with time slot 1101 may only include the parameters used for the SL data transmission in that particular time slot 1101.

FIG. 2B is another plot illustrating an example of a configuration of an SA. FIG. 2B illustrates the same time slots as FIG. 2A. However, an SA transmission is performed only in time slot 1101, and is associated with all transmissions in the transmission pattern. Therefore, the SA transmitted during time slot 1101 in FIG. 2B includes the transmission pattern and resources used for each SL data transmission in time slots 1101, 1103, 1105 and 1106 (may include both time domain and frequency domain configuration described earlier). An SA may also include the number of transmissions for the TB, and the RV sequence associated with the transmissions. The SA may also indicate the starting time location of the transmission pattern or the starting time location of the initial transmission of the TB. In some embodiments, an SA may use its own time location as reference and only include a time gap between the SA and the corresponding data transmission (initial transmission of a TB, the starting location of the transmission pattern or the data transmission associated with the SA) instead. In the case of SA and its associated SL transmission being FDDed as in FIG. 2A or otherwise combined in the same time unit, the time location of the associated SL transmissions may be derived from the time location of the SA.

In FIGS. 2A and 2B, the SA and SL data transmissions are separated using frequency division duplex (FDD). In such a scenario, the time locations of an SA may not need to be explicitly configured by the BS in the example SL transmission modes described herein, as the time location of an SA can be derived from the time location of its associated SL data transmission/transmissions. However, in general, the SA and SL data transmissions may be separated using other configurations, such time division duplex (TDD). In the case of TDD, an SA may include a time gap between the time location of the SA and the time location of its associated SL data transmission (in a configuration of FIG. 2A) or the SA may include a time gap between the time location of SA and the time location of the initial SL data transmission or the transmission pattern of its associated data transmissions of the TB (in a configuration of FIG. 2B). Similarly, in the case of TDD, when configuring the SA resource, the BS may indicate a similar time gap between SA and its associated data transmission such that a UE can derive the time resource used for SA given the time resource configured for the data transmission.

For the SA in the configurations of FIGS. 2A and 2B or an SA in general, the SA may indicate the time and frequency resources used for each SL transmission of the TB.

Time frequency resources may include the number of sub-channels used for each SL data or physical sidelink shared channel (PSSCH) transmission (which may be referred to as a PSSCH partition). The definition of subchannel may include size of subchannel (e.g. in resource blocks), and/or number of subchannels in frequency domain. The location of sidelink control channel (SCI) can be signaled in different methods. In some embodiment, the pool of all SCI location (also named PSCCH pool) may be defined first in the resource pool and then the exact location of SCI can be further defined in the GF resource configuration. In one example, if PSCCH is not transmitted in adjacent RBs with PSSCH, the PSCCH pool is a separate region in frequency domain next to the frequency subchannels used for data transmission. Each SCI corresponding to each data frequency channel is equal size. Therefore, once the PSCCH pool is defined, e.g. through signaling the starting RB of PSCCH pool and the number of RBs used for SCI in frequency domain, UE can derive the location of SCI. In some embodiment, the number of RBs used in SCI is predetermined without signaling. In another scenario, SCI is always at fixed location with respect to the PSSCH transmission (e.g. 2 RBs for each slot transmission next to the PSSCH transmission). In both cases, a UE will be able to know where to detect SCI, either based on some default rule, or through configuration. Periodicity indicates the time duration between two neighboring GF resource or resource bundle that repeats over time. Here resource bundle refers to multiple PSSCH resources defined in a pattern. In some embodiments, the pattern is used for multiple repetitions of a TB. In some embodiments may allow the of use the resource pattern for transmission of different TBs. The pattern window length is the time domain length of which each transmission pattern is defined within.

Figure 3A:
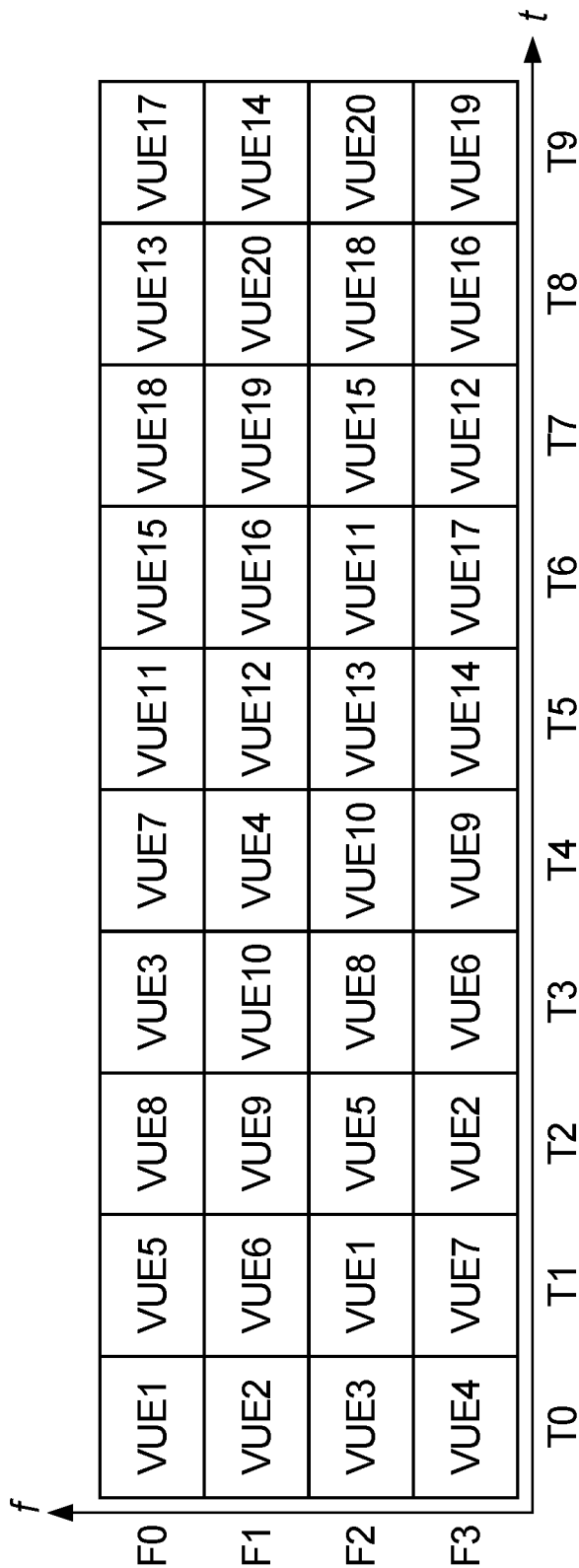
FIG. 3A is a specific example of time frequency parameters, definition of subchannnels, transmit pattern etc.

FIG. 3A shows a specific example of time frequency parameters, definition of subchannnels, transmit pattern etc. With this example, time is on the horizontal axis and frequency is on the vertical axis. Frequency is divided into four; each division is the frequency partition for one PSSCH transmission in frequency domain, which may be one or multiple resource blocks. Each frequency partition may be one subchannnel or multiple subchannels. The number of RBs and starting RBs for each frequency subchannel may be determined from the resource configuration or definition of resource pool or pattern pool. The number of subchannels used for each PSSCH transmission in the frequency domain in the case when multiple subchannels can be used may also be signaled in the resource configuration. Time is shown divided into ten time units; each division is the size of PSSCH transmission in the time domain, and may be one or multiple OFDM symbols. Each division can be a slot. A transmit pattern is made up of multiple blocks of time frequency resources. For example, the pattern labelled UE1 has a block in F0, T1, and another block in F2,T2. Shown are 19 patterns within the depicted resource. Note that in the pattern shown below, T0 to T4 shows a pattern window, within which the non-overlap pattern of VUE 1 to VUE 10 is defined. 10 new patterns for another different 10 UEs (VUE11-VUE20) are defined in T5-T9, which is a repetition of the 10 patterns defined in T0-T4. The 20 patterns defined within the pattern grid shown in the figure may be repeated over time for VUE1 to VUE 20, i.e., VUE1 to VUE20 may be configured a new pattern of two resources every 10 time units. Use 1 time unit (T0) equals 1 slot as an example, in the example pattern pool defined in the following figure, the pattern window length=5 slot and periodicity=10 slots.

The Reference signal (RS) may include but is not limited to:
 a. PSSCH/DMRS mapping type. Type A may indicate the DMRS location is at fixed symbols among the slot. Type B may indicate the DMRS symbol location depends on the starting and ending symbol configuration of the data resource.
 b. DMRS location and symbols. Which may indicate how many DMRS symbols are used and location of DMRS symbols.
 c. DMRS sequence initialization;
 d. Antenna port;
 e. number of layers;

A pool of DMRS means all the possible DMRS parameters that can be used for the UE. The definition of all the configuration parameters may be used throughout the disclosure.

In some embodiments, there is no SCI associated with the PSSCH transmission, and the SCI need not be transmitted at all. In some other embodiments, SCI may be defined and transmitted with SL data transmission, but does not include dynamic scheduling information. Details of these options are described among the different examples presented below.

Example 1: Configure Transmission Parameters for Both Transmitter and Receiver UE in SL For unicast/multicast/groupcast/broadcast transmission, the network may set up a UE pair (including a transmit and a receive UE for unicast transmission) or a UE group (that includes a transmit UE and a receive UE group for multicast transmission or includes a transmit UE group and a receive UE group for groupcast transmission) first.

In this case, there may be a link established between the transmit UE or UE group with the receive UE or UE group before transmission. In an example of establishing the link, the network signals the destination ID or IDs or destination ID group to the transmit UE or transmit UE group and the network may signal the source ID or IDs or source ID group to the receive UE or receive UE group for the transmission. In another example of how to establish the link, the transmit UE sends a discovery signal to find receive UEs that are within reach of the signal. The UE or UEs or UE group that received the discovery signal may send a signal to the BS and/or the transmit UE to confirm the reception. BS may then send another confirmation signal to the transmit UE and optionally to receive UE as well to inform the establishment of the link between the two UEs. The signal may include a destination ID of the receive UE to the transmit UE. The receive UE may obtain the identity (ID) of the transmit UE (sometimes called source ID) through a confirmation signal from BS or a discovery signal it receives from the transmit UE.

After the link is established, such that the UEs are aware of which UE(s) are transmitting and which UE(s) are receiving, the network can semi statically configure the same set of transmission parameters to both the transmit UE or transmit UE group, and the receiving UE or transmit UE group. The parameters can be configured in RRC signaling, in broadcast signaling (e.g. in system information) or preconfigured to the UEs.

Each set of parameters may include, but is not limited to:
 Time and frequency resources, periodicity, pattern window length, frequency sub-channel definition, location of SCI, (initial or default) transmission pattern and/or transmission pattern pool, MCS or MCS pool, DMRS or DMRS pool, frequency hopping parameters, repetition K, HARQ process related parameters, feedback channel locations, RV sequence, and optionally Destination ID or destination group ID and optionally source ID and optionally destination ID.

Since the set of parameters are configured for both transmitter UE and receiver UE, the transmit UE can use the set of parameter for transmission and the receive UE can use the same set of parameters to receive the SL data transmission sent by the transmitter UE.

BS may signal the set of parameters individually using UE specific signaling, such as RRC signaling, to the transmit UE and receive UE. In such scenario, a destination ID may be included with the parameter set sent to the transmitter UE. A source ID may be included with the parameter set sent to the receiver UE. The set of transmission parameters should be the same to the transmit UE and receive UE for the receive UE to receive the SL transmission. In some embodiment, BS may broadcast or multicast the same configuration of parameter to both the transmit UE and the receive UE. In such scenario, since the same signaling that include the set of parameters is sent to both the transmit and receive UE, the set of parameters may include or associated with both the source ID and destination ID such that both the transmit UE and receive UE can identify which link the parameter is used for.

In some embodiments, to indicate a data transmission, an SCI is transmitted in the configured location. Once a receive UE detects the SCI at the configured location, the receive UE assumes the set of RRC configured or preconfigured transmission parameters will be used. The destination ID can be included in the header information, such as in MAC header or MAC CE or in general just part of the data transmission, so if data transmission is successful, the UE can confirm whether the transmission is targeted for the UE.

In some embodiments, to indicate a data transmission, a DMRS is transmitted in the configured location. In this case, an SCI may not be transmitted at all. Once a receive UE detects the DMRS at the configured location, the receive UE assumes the set of RRC configured or pre-configured transmission parameters will be used. Once again, the destination ID can be included in the header information, such as MAC header or in MAC CE or in general just part of the data transmission, so if data transmission is successful, the UE can confirm whether the transmission is targeted for the UE.

Alternatively, the UE may be configured to detect the data based on the time-frequency resource or transmission pattern and/or MCS defined in the configuration and if detection is successful, the UE can confirm whether the transmission is targeted for the UE by obtaining the destination ID in the data transmission. In this case, the UE is not relying on SCI or DMRS.

In another example, SCI is transmitted, but the SCI may include destination ID without scheduling information. In such embodiments, a receive UE may be configured to decode the SCI first, and if the destination ID is confirmed to be for the receive UE, then the receive UE attempts to decode the data using parameters defined in the configuration.

Example 2: Multiple Receive Parameter Sets Associated with DMRS or Preamble or Source ID With this example, a UE is configured with multiple receive parameter sets, (for example by RRC signaling, system information in one or more SIB or preconfigured). This may be viewed as configuring a receive resource pool and multiple set of receive parameters configured inside a receive resource pool. Alternatively, each set of receive resource parameter is configured in a resource pool. In another example, each set of resource parameters may simply be a set of receive resource configuration within a GF configuration.

In some embodiments, the UE is configured with multiple GF configurations, which may be defined within SL BWPs. Each GF configuration may include one or more of transmit resource or resource pool and receive resource or resource pool.

The multiple configurations can be semi-static or semi-persistently configured, the configuration signaling can include RRC, system information (SIB), preconfigured, or a combination of RRC and SIB.

Each set of receive parameters for a receive UE may include one or more of: time/frequency location, periodicity, frequency sub-channel definition, transmission pattern or transmission pattern pool, pattern window length, DMRS/preamble or DMRS pool, transmission patterns, SCI location, MCS or MCS pool, repetition K, RV sequence, HARQ process related parameters, feedback channel parameter, and in some embodiments source ID. The set of parameters within one set may be consider to be associated with each other. Once UE determines one parameter in the set while receiving a SL transmission, UE may derive other parameters based on this association.

Each set of parameters for a transmit UE may include one or more of: time and frequency resources, periodicity, pattern window length, frequency sub-channel definition, location of SCI, (initial or default) transmission pattern and/or transmission pattern pool, MCS or MCS pool, DMRS/preamble or DMRS pool, RV sequence, HARQ process related parameters, feedback channel parameter and in some embodiments Destination ID or destination group ID In some embodiments, an SL transmission pattern represents a sparse set of communication resources. More generally, the SL transmission pattern defines how communication resources are to be used by UEs for SL transmissions, and can be designed to enable all UEs in a cooperation group to communicate with each other even if some transmissions are transmitted in a grant-free manner (i.e., without dynamic scheduling). This could be especially useful in applications such as V2X and UE cooperation, and/or other applications as well.

In some embodiments, the transmission pattern indicates a number of "on" or usable resources within the time window of the transmission pattern. In a time-frequency based transmission pattern, for example, the UE transmits using time-frequency communication resources in time slots that are designated as "on" time slots by the transmission pattern, and receives in time slots that are not designated as "on" time slots (or are otherwise designated as "off" time slots) by the transmission pattern. In this sense, a transmission pattern could be considered a form of "on-off" pattern in some embodiments.

The transmission pattern (or, in some embodiments, the on-off pattern) may define the resources used for a number of transmissions of a transport block (TB). The transmissions may include the initial transmission and retransmissions of the same TB. The initial transmission and retransmission of the TB may sometimes also be referred to as repetitions. In some embodiments, each transmission pattern may represent transmissions of one transport block (TB), i.e., a UE should start initial transmission of a TB at the first "on" slot in the transmission pattern, and continue repetition of the TB on all the "on" slots until the end of the "on" slots defined by the transmission pattern. In this type of application, a transmission pattern (or on-off pattern) could be considered a repetition pattern. In some embodiments, a UE may also listen to other UE's transmissions in the "off" slots defined by the transmission pattern or any slot that is not defined as an "on" slot in the transmission pattern. As described above, reference signals may be used to accommodate SL data transmission. Some embodiments described herein outline signaling mechanisms that could be used to for grant-free SL communications using transmission patterns.

In some embodiments, a UE is configured to use a transmission pattern defining or otherwise indicating communication resources that are allotted or allocated to the UE over a specific time interval for SL communications. Other UEs are similarly configured to use respective transmission patterns over this time interval. A UE can transmit and receive SL transmissions within a time interval using these communication resources according to its transmission pattern. A half-duplex UE might still be transmitting at certain times while other UEs are transmitting, but transmission patterns could be designed to provide an opportunity for each UE to receive SL transmissions from all other UEs at least once during the time interval if all UEs are configured and transmitting during the time interval using their respective transmission patterns.

Time is one dimension that may be used in defining communication resource usage in a transmission pattern. Other dimensions, such as frequency, code, and/or signature are also contemplated.

Transmission patterns may belong to a transmission pattern set or pool that is common to a group of UEs. RRC signaling may be used to configure the transmission pattern for a UE and/or a transmission pattern pool. Transmission pattern pool may also be signaled by broadcast signaling (e.g. in SIB).

FIG. 1A is a block diagram illustrating an example of a two-dimensional resource configuration for grant-free SL transmission. This is an example of a transmission pattern. FIG. 1 illustrates a resource grid 100, which includes frequency-domain resources F0, F1, F2 and F3, and time-domain resources T0, T1, T2, T3 and T4. Each combination of frequency-domain resource and time-domain resource forms a communication resource for SL transmission. FIG. 1A also illustrates a transmission pattern for a UE1. Resource grid 100 indicates a time-frequency communication resource for two transmissions by UE1, as well as a redundancy version (RV) (RV0 or RV3) in a label on each communication resource.

In FIG. 1A, UE1 is configured with a transmission pattern, which explicitly defines the transmission repetition number as well as the communication resources for each repetition. Each repetition may also be associated with an RV, which can be predefined or preconfigured (e.g. configured using a UE specific RV sequence indicating the associated RV for each repetition). A single UE index is used to indicate both time-domain and frequency-domain resources in FIG. 1A. In general, a UE index corresponds to a specific UE or a UE group. The communication resources assigned to UE1 form the transmission pattern for UE1.

The resource grid 100 has a frequency-domain length of 4 and a time-domain length of 5. In the time-domain, T0 to T4 could be slots, mini-slots, symbols, or any other quantization or unit of time. In the frequency-domain, F0 to F3 could be frequency sub-channels, combinations of sub-channels, resource blocks, resource block groups (RBGs), bandwidth parts (BWPs), subcarriers, a number of subcarriers, carriers or any other quantization or unit of frequency. Different frequency domain sub-channels are just an example. Sub-channels can instead be associated with different layers of non-orthogonal multiple access (NOMA), different pilot resources, and/or other resources. Although shown as time-domain resources and frequency-domain resources in FIG. 1A, in general the transmission pattern could also or instead include code-domain resources (such as sparse code multiple access), space-domain resources, and/or different demodulation reference signals (DMRS). Moreover, the transmission patterns are not limited to two-dimensions, and therefore could include a number of dimensions greater or less than two.

In some embodiments, frequency-domain resources, pilots and layer index may be associated with time-domain signatures. For example, as an alternative to using a UE index, the resource grid 100 could indicate only the time-domain signature or time-domain transmission pattern, and other dimensions (e.g. the frequency-domain dimension) may be derived from it.

Figure 1B:
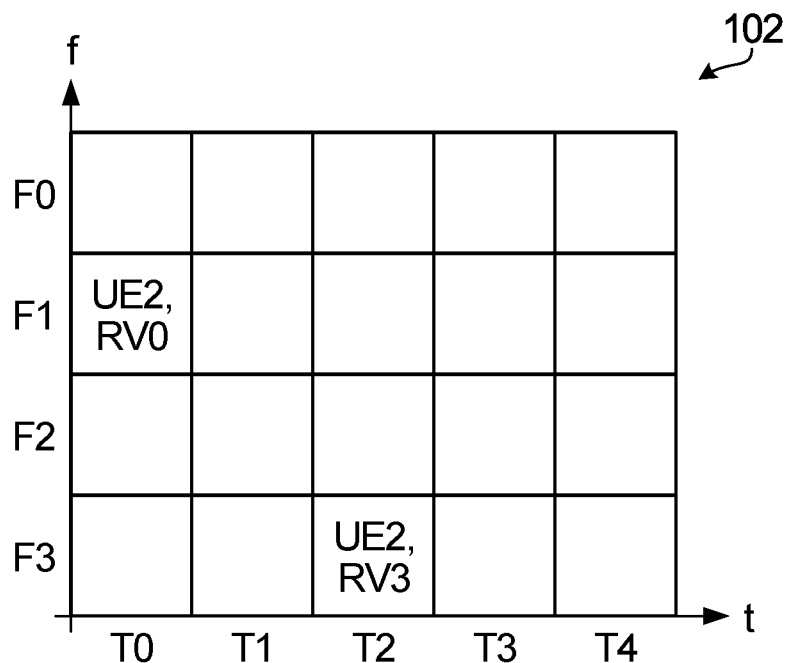
FIG. 1B-1K are block diagrams illustrating other examples of two-dimensional resource configurations for grant-free SL transmission.
Figure 1C:
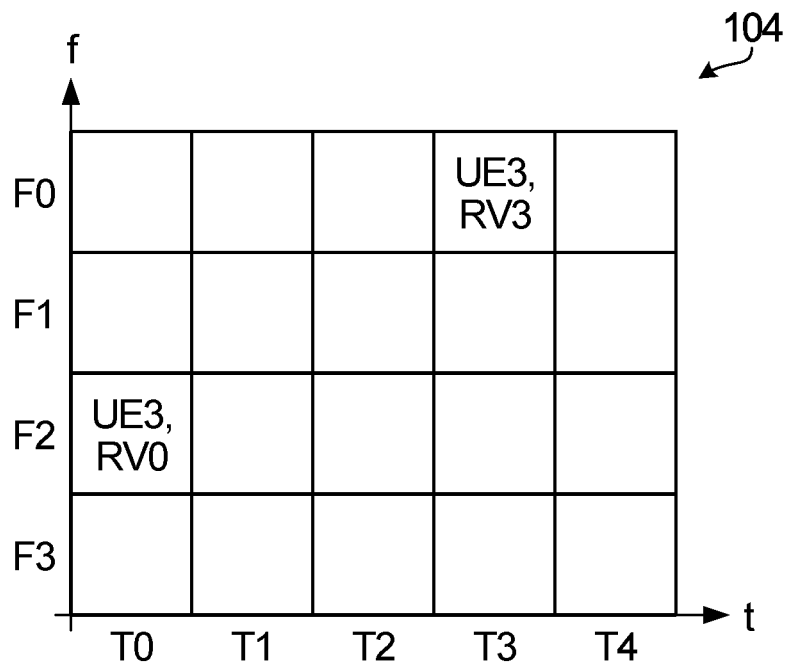
Figure 1D:
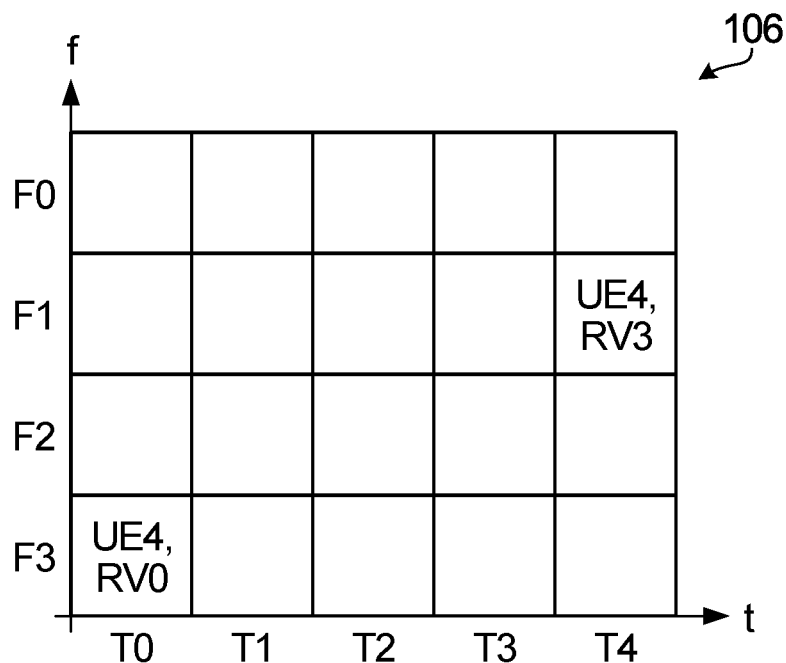
Figure 1E:
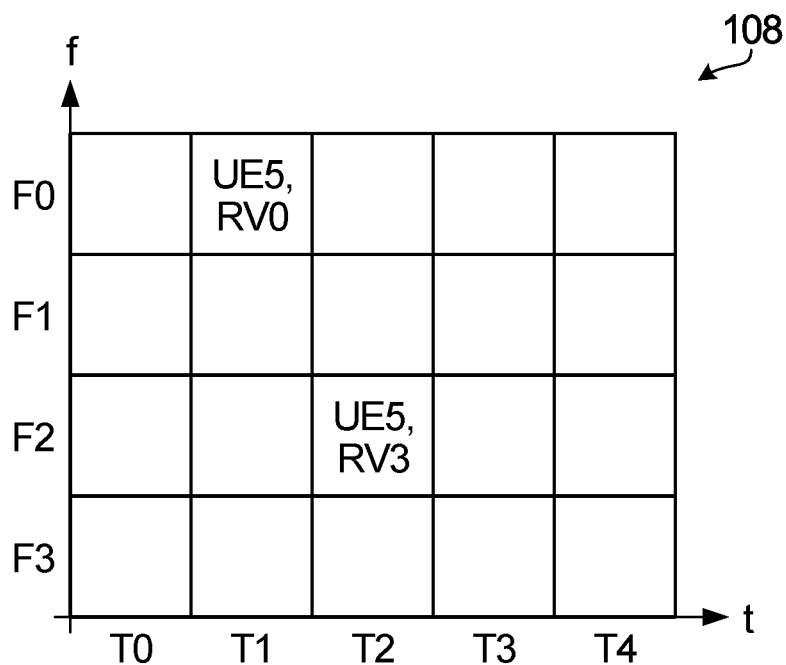
Figure 1F:
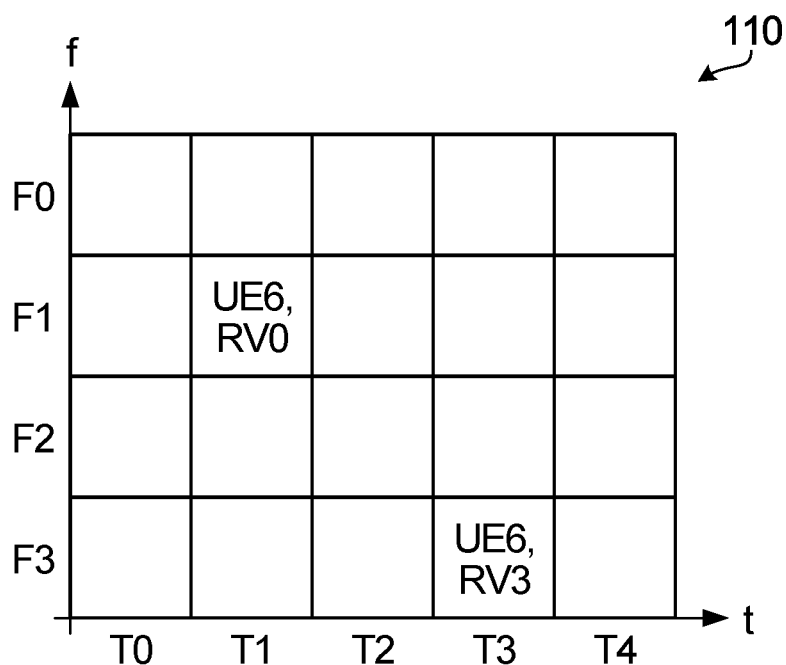
Figure 1G:
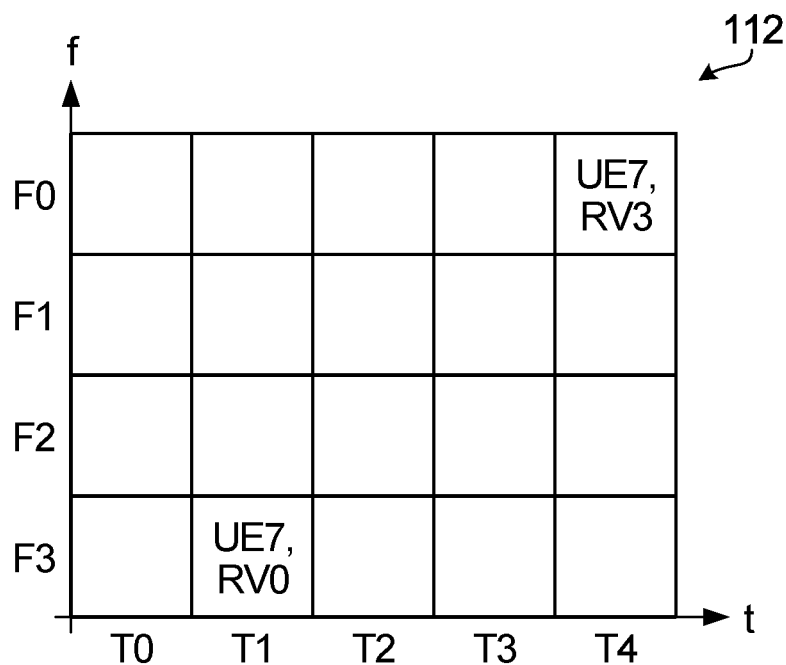
Figure 1H:
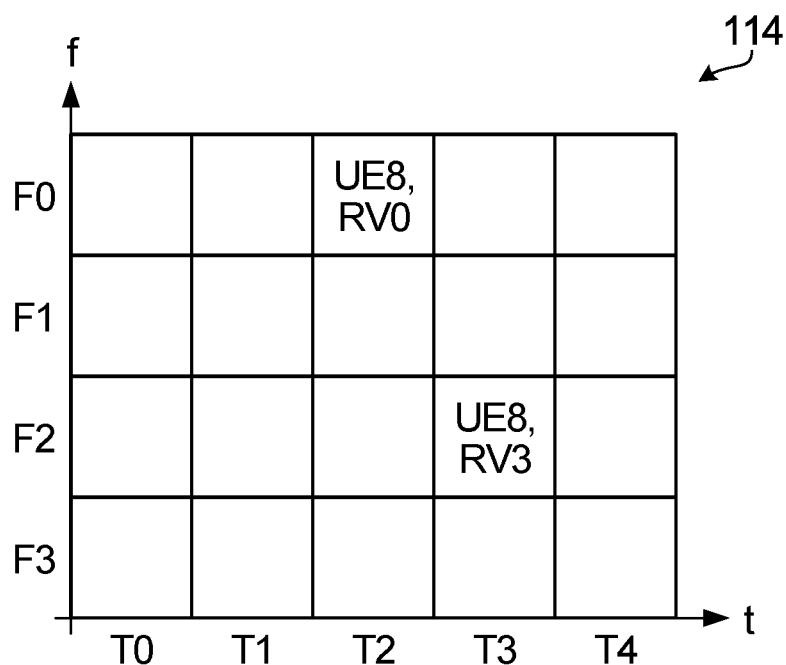
Figure 1I:
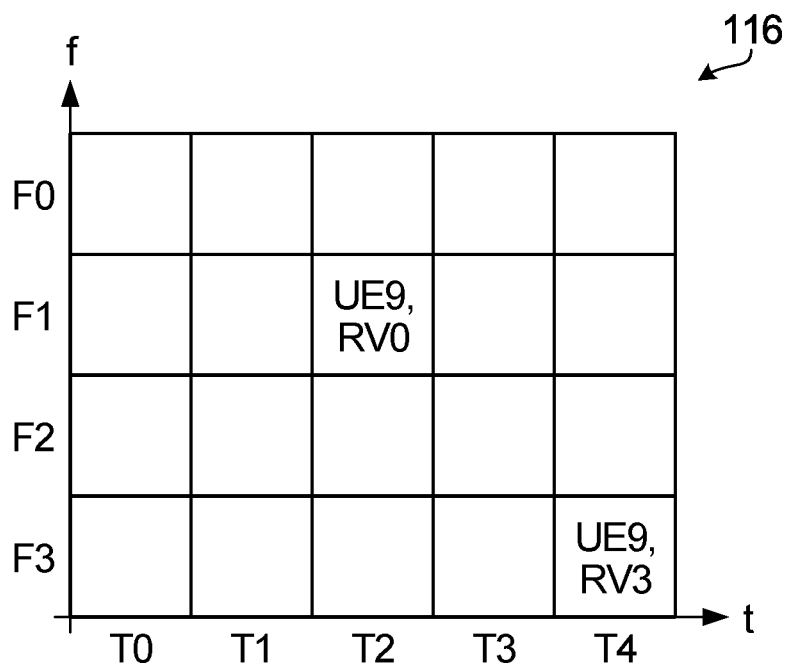
Figure 1J:
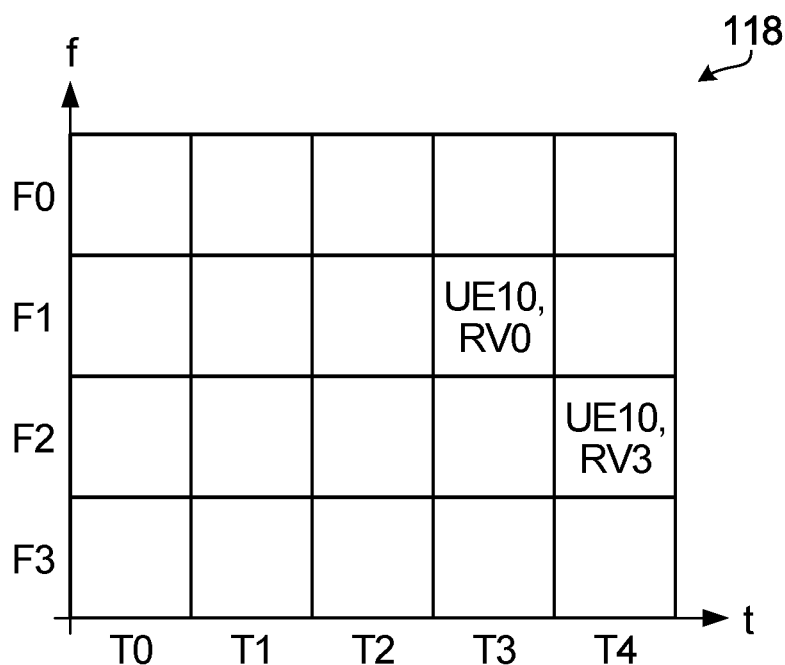

FIG. 1B is another block diagram illustrating an example of a two-dimensional resource configuration for grant-free SL transmission. FIG. 1B illustrates a resource grid 102. Resource grid 102 includes the same frequency-domain resources F0, F1, F2 and F3, and time-domain resources T0, T1, T2, T3 and T4 as resource grid 100 in FIG. 1A. FIG. 1B also illustrates a transmission pattern for UE2.

Resource grid 102 indicates time-frequency communication resources for two transmissions by UE2, as well as a redundancy version (RV0 or RV3) in a label on each communication resource. These time-frequency communication resources define the transmission pattern for UE2. The time-frequency communication resources indicated in resource grid 102 for UE2 are different from the time-frequency communication resources indicated in resource grid 100 for UE1.

FIGS. 1C, 1D, 1E, 1F, 1G, 1H, 1I and 1J are further block diagrams illustrating other examples of two-dimensional resource configurations for grant-free SL transmission. FIGS. 1C, 1D, 1E, 1F, 1G, 1H, 1I and 1J illustrate resource grids 104, 106, 108, 110, 112, 114, 116 and 118, respectively, each resource grid including the same frequency-domain resources F0, F1, F2 and F3, and time-domain resources T0, T1, T2, T3 and T4 as resource grid 100 in FIG. 1A. Resource grids 104, 106, 108, 110, 112, 114, 116 and 118 each indicate communication resources defining the transmission patterns for UE3, UE4, UE5, UE6, UE7, UE8, UE9 and UE10, respectively, as well as a redundancy version (RV0 or RV3) in a label on each communication resource. Each communication resource indicated by resource grids 100, 102, 104, 106, 108, 110, 112, 114, 116 and 118 are unique.

Figure 1K:
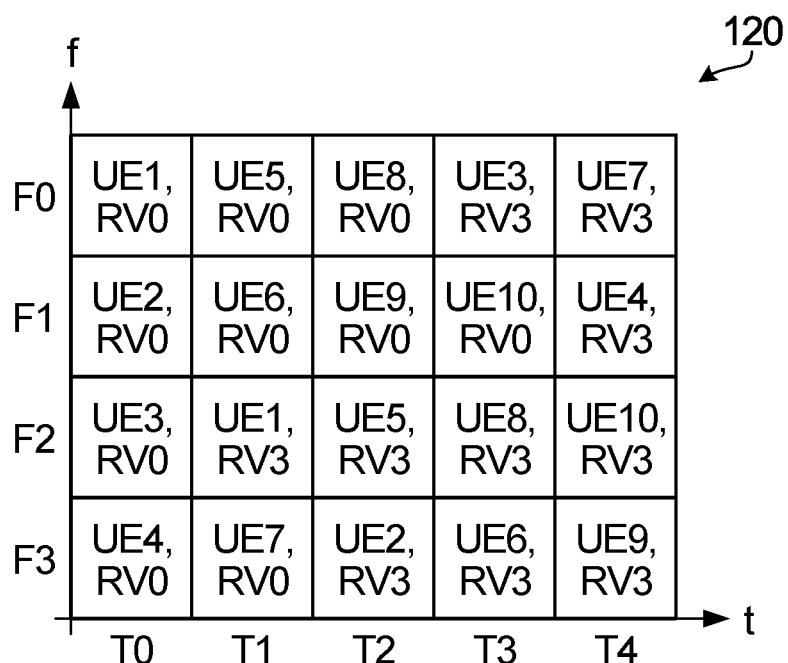

FIG. 1K is yet another block diagram illustrating a two-dimensional resource configuration for grant-free SL transmission. FIG. 1K illustrates resource grid 120, which also includes the same frequency-domain resources F0, F1, F2 and F3, and time-domain resources T0, T1, T2, T3 and T4 as resource grid 100 in FIG. 1A. Resource grid 120 is a superposition of resource grids 100, 102, 104, 106, 108, 110, 112, 114, 116 and 118. Therefore, resource grid 120 may be considered to indicate a transmission pattern pool, which includes the transmission patterns for UE1-UE10.

The communication resources illustrated in FIG. 1K are used for SL transmission by respective UEs, according to their transmission patterns. In general, each communication resource represents a potential transmission of a transport block (TB). The same TB is used in each transmission by a UE over the length of a transmission pattern. In FIG. 1K, according to their respective transmission patterns, each UE transmits a TB twice over the length of the configured transmission pattern, therefore the repetition number of each transmission pattern is 2. As explained below, this allows each UE receive at least one transmission of the TB by the other UEs.

Each parameter set has a DMRS/preamble configuration that is associated with that parameter set. Once a UE decodes the DMRS/preamble, by using the DMRS/preamble alone or using the DMRS/preamble along with the time frequency location of DMRS or SCI or data transmission that it detects, the UE can determine the associated parameter set, such as the transmission pattern, MCS, RV sequence. No blind detection is needed.

In another example, a UE may determine the receive parameter set based on source ID. The source ID may have an association with the transmission parameters, such as transmission pattern, MCS, DMRS etc. The association can be defined by having source ID and other parameters, such as MCS and DMRS, in the same set of receive parameters. For example, if there is SCI transmitted associated with the PSSCH transmission, the SCI may include the source ID and destination ID. Once the receive UE verifies the source ID belongs to one of the receive resource parameter sets, the UE may attempt to decode the data based on the corresponding receive resource parameter set.

In another example, if a UE detects the time frequency location of a PSSCH transmission (e.g. locate the transmission of SL data in a specific slot and specific frequency subchannel or subchannels), then the UE can find which receive resource set is used simply based on the time frequency location of the transmission. The detection of PSSCH transmission can be done through SCI detection if SCI exists or DMRS detection or simply energy detection of the transmission signal. Again, if SCI includes destination ID, a UE can verify whether the transmission is targeted itself by check the destination ID.

For transmission, each UE may be configured one or multiple sets of transmit parameters. Each set of transmit parameters may include time/frequency location, periodicity, frequency sub-channel definition, DMRS/preamble, transmission pattern, SCI location, MCS, repetition K, HARQ process related parameters, feedback channel, and in some embodiments destination ID. If the set of parameters includes the destination ID, the UE may use the set of parameters for transmission to the specific UE or UE group defined by the destination ID. If a UE is configured with set of parameters without the destination ID, the UE may use the set of parameters for transmission to any UE or UE group.

This example requires the network to have some coordination for configuration in order to match transmit and receive parameter sets. In UL GF, the BS is the receiver and knows all the configuration parameters. In SL, the receiver UE does not know the configuration, so the network configures all possible parameter sets to the UE.

Example 3—Receive Parameter Pool for Each Receive Parameter

With this example, a receiver UE is configured with respective receive parameter pools for a number of different receive parameters. Further, a transmitter UE may be configured with a set of transmit parameters or with respective transmit parameter pools for a number of different transmit parameters. When the transmitter UE performs the sidelink transmission using given transmit parameters, the receiver UE will need to receive the sidelink transmission using correct receive parameters that correspond to the given transmission parameters. Embodiments of present disclosure enable the receiver UE to use the correct receive parameters to receive a sidelink transmission. In embodiments, the receive parameter pools will include sets of receive parameters corresponding to the transmission parameters, and each set of receive parameters includes a first parameter associated with one or more other parameters. In this way, if the receiver UE can obtain the first parameter, it may derive one or more of the remaining parameters necessary for receiving the sidelink transmission.

The receive parameter pools may include: time/frequency resource pool, transmission pattern pool, MCS pool, DMRS pool etc., frequency sub-channel definition, RV sequence pool. Some of the receive parameters may be same as transmit parameters and not signaled separately.

The transmitter UE may be explicitly configured, by a base station, with a set transmit parameters, such as transmission pattern, DMRS, MCS, etc. In this case, the transmitter UE performs the sidelink transmission using the set configured transmit parameters. For example, the transmitter UE may be configured with one or multiple set of transmit parameters. Each set of transmit parameters may include time/frequency location, periodicity, frequency sub-channel definition, DMRS/preamble, Transmission pattern, SCI location, MCS, repetition K, HARQ process related parameters, feedback channel, RV sequence and in some embodiments destination ID. If the set of parameters includes the destination ID, the UE may use the set of parameters for transmission to the specific UE or UE group defined by the destination ID. If a UE is configured with set of parameters without the destination ID, the UE may use the set of parameters for transmission to any UE or UE group.

Alternatively, the transmitter UE may be configured, by the base station, with a pool of transmission parameters, rather than an explicit set of transmission parameters. For example, the transmitter UE may be configured with one or more of a transmission pattern pool, DMRS pool, and MCS pool. In this case, the UE may select one or more transmission parameters from the pool of transmission parameters. In particular, the selected one or more transmission parameters is associated with another transmission parameter and this association can be known to the receiver UE. Therefore, the receiver UE can use this association to more easily obtain the receive parameters necessary for receiving the sidelink transmission.

Since the transmission parameters include these associations that can be known to the receiver UE, the transmitter UE can select one or more transmission parameters in a variety of ways. For example, the transmitter UE can randomly select a transmission pattern from a pool of transmission patterns. The transmitter UE will then use that transmission pattern and other associated transmission parameters, such as DMRS and/or MCS, to perform a sidelink transmission. In a further example, multiple DMRSes are associated with the selected transmission pattern; therefore, the transmitter UE may select a DMRS from the subset of DMRSes. In any of these above examples, the receiver UE may implicitly derive the transmission pattern of the transmitter UE if it can obtain the DMRS associated with the transmission pattern. In another example, if DMRS is associated with both MCS and transmission pattern, UE may first select a transmission pattern among the transmission pattern pool, a MCS among a MCS pool, then UE may further select a DMRS among the subset of DMRSes that are associated with the selected transmission pattern and MCS.

If SCI is used and associated with the SL data transmission, the SCI may include destination ID or destination group ID for quick decoding. In this case, the UE detects the SCI and determines whether to decode the resource based on whether the destination ID matches itself.

Alternatively, no SCI is transmitted, and the UE attempts to decode the data first and verify a destination ID that is transmitted along with the data. In this case, the UE decodes all the potential transmissions and finds the destination ID after decoding the data.

The DMRS/preamble or an advanced indication signal may be used to indicate one or a combination of:
  transmission pattern within the transmission pattern pool,
  Time and frequency locations of each transmission/repetition of a TB or simply each transmission within a transmission window or periodicity
  MCS within MCS pool;
  Redundancy version;
  HARQ process ID Once a UE detects the DMRS/preamble/other indication, the UE can determine the indicated parameters (transmission pattern and/or MCS and/or RV) in order to decode the data. For example, some other parameters, such as source ID, MCS, HARQ process ID, destination ID or more detailed destination ID if it is partially included in SCI, can be included in the header or just included in the data transmission. After decoding DMRS/preamble/other indication, the UE obtains all the information required for decoding. If MCS is not indicated by DMRS, UE may do blind detection of MCS based on MCS pool or potential MCS.

For example, if the parameter is a more detailed destination ID, a partial version of the detailed destination ID can be included in the SCI. Therefore, a UE receiving the SCI can determine whether a SL data transmission indicated by the SCI is likely targeted to the UE. Thus, the UE can more easily determine whether to decode transmission resources associated with the SL data transmission. Since only a partial version of the destination ID is included in the SCI, the overhead cost associated with the destination ID may be reduced.

Use of DMRS to Indicate Parameter set from Set of Possible Parameter Sets or to Indicate Associated Value of a Parameter for each of at least one Parameter Pool In Example 2 above, a DMRS is transmitted to indicate a parameter set from a set of possible parameter sets. In Example 3 above, a DMRS is transmitted to indicate an associated value of the parameter for each of at least one transmit parameter pool.

In some embodiments, to indicate the parameter set or associated value(s), DMRS has a predefined or a configured mapping/association to the parameter sets or associated values. The association/mapping between DMRS or DMRS parameters and the parameter set or associated values may be predefined. The association/mapping may also be configured to the UE through signaling (e.g. through RRC signaling, system information or preconfigured to the UE). With the mapping, if a UE detects a DMRS, the UE can then derive which parameter set or associated values the transmitter is using.

The mapping that is used to associate DMRS to specific parameter sets or associated value(s) may be based on one or a combination of DMRS sequence, different roots/initialization for the DMRS sequence, different cyclic shift values, DMRS time and frequency locations (e.g. different symbols), different orthogonal cover code used, different antenna ports, different code division multiplexing (CDM) groups, different DMRS patterns or some other aspect of the DMRS.

DMRS is mainly used for channel estimation. An example of DMRS can be the DMRS used in 3GPP NR uplink described in 3GPP TS 38.211 V15.0.0. Another example of DMRS would be the UL DMRS used in LTE. In SL transmission, similar DMRS structure as LTE or NR uplink may be used. DMRS can be generated using a sequence, such as gold sequence (or m-sequence) or Zadoff Chu sequence. The sequence is usually calculated using a root or an initialization value. The sequence may be further applied with a phase shift (some time called a cyclic shift). For example, in LTE, a phase shift is applied to the Zadoff Chu sequence used for uplink DMRS, and the phase shift is usually called cyclic shift and can be indicated using a cyclic shift value or cyclic shift index. In LTE, the value of cyclic shift is indicated in DCI as one of 8 possible choice of cyclic shift value using 3 bits.

The sequence may be further multiplied using an orthogonal cover codes (OCC). The sequence may be further precoded and then mapped to time frequency resources and modulated to a reference signal and transmitted over the air. Orthogonal cover codes may include orthogonal cover codes applied to time domain or frequency domain. DMRS sequence may be also applied to time frequency locations (e.g. in different resource elements) with different allocation patterns. DMRS signal transmitted from the same time frequency resource may interfere with each other, therefore it is desirable to design different DMRS that can multiplexed together with minimum interference to each other. This can be achieved by using DMRS sequence with low correlation among each other. Another way to achieve multiplexing of different DMRS is to use code division multiplexing (CDM), time division multiplexing (TDM) or frequency division multiplexing (FDM). Orthogonal cover codes are an example of CDM. Different allocation patterns (map DMRS sequence to different time frequency locations) to create different DMRS can be considered TDM or FDM. In some scenarios, the combination of different DMRS properties may be characterized by a single DMRS parameters, for example in new radio (NR) cellular system, different CDM, TDM, FDM patterns and different OCC used may be indicated using a single parameter as antenna port. The combination of DMRS sequence, different allocation patterns (TDM, FDM), different orthogonal cover codes used (different CDM pattern) and different DMRS locations together generates different DMRS.

The DMRS parameter may be known by the UE, then UE can detect DMRS without blind detection. In some cases, the exact DMRS parameter may not be known by the UE. In this case, UE can blind decoding DMRS to find which DMRS and which DMRS parameters are used. There is usually a finite choice of DMRS parameters that are known to the UE. An example way to do DMRS detection is to use different choices of potential DMRS sequences to correlate with the DMRS at the potential location of DMRS and find which one gives the highest correlation by finding the output signal with the highest energy.

For example, in 4G LTE, a Zadoff-Chu (ZC) root sequence may be used to generate a pool of DMRS sequences generated according to the following formula $$X_{m,k}^{ZC} = e^{-j\pi q \frac{k(k+1)}{M_{ZC}}}, 0 \leq k < M_{ZC}.$$

Where M_{zc} is the length of the root sequence, q is the index of the reference Zadoff-Chu sequence or the root of the sequence. The reference pilot sequence of given length is the cyclic extension of the original Zadoff-Chu sequence. The cyclic shift (phase rotation in frequency domain) of the reference sequence creates multiple orthogonal pilot sequences: $X_k = X_k^{ZC} e^{-j\alpha k}$, In LTE $\alpha = 2m\pi/12$, $m \in \{0, 1, \ldots, 11\}$. An orthogonal cover codes may be applied to the two symbols used for DMRS for each subframe. In this scenario, the root q, cyclic shift value alpha, and the orthogonal cover codes used are all properties of the DMRS. And UE can do DMRS detection and find out which root, which cyclic shift value and which orthogonal cover codes are used. And one or a combination of these properties (roots, cyclic shift and orthogonal cover codes) may be associate with the parameter set or associated value(s). After receiving UE detecting the DMRS, UE knows the parameter set or associated value(s) that the UE who transmitted the DMRS will use/is using for data based on the association between DMRS and the parameter set or associated value(s).

In another example, in NR, if transform precoding for PUSCH is not enabled, the reference-signal sequence r(m) shall be generated according to $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is a defined by a length-31 Gold sequence and initialized using some given parameters. There are limited number of gold sequences that can be used to generate the DMRS. After precoding, the sequence is mapped to the time frequency resource using the following:

The UE shall map the sequence to physical resource elements according to $$a_{k,l}^{(p_j,\mu)} = \beta_{DMRS} w_f(k') \cdot w_t(l') \cdot r^{(p_j)}(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

where $w_f(k')$, $w_t(l')$, and $\Delta$ are given by the specification defined in 3GPP TS 38.211, one of the example table for a configuration type is shown below.

TABLE 6.4.1.1.3-1

Parameters for PUSCH DM-RS configuration type 1.

| p | CDM group | $\Delta$ | $w_f(k')$ k'=0 | $w_f(k')$ k'=1 | $w_t(l')$ l'=0 | $w_t(l')$ l'=1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

Here $\Delta$ value represents different DMRS time-frequency mapping patterns or different TDM/FDM scheme (FDM for this particular example where different value represents mapping to different subcarriers), which also corresponds to different CDM group in this example. $w_f(k')$ and $w_t(l')$ are frequency domain and time domain orthogonal cover codes used. They are all determined using a single antenna port value p that can be indicated to the UE. The different gold sequence, orthogonal cover codes (OCC), different mapping pattern together generates different DMRS. And all the DMRS properties, such as different sequence, time and frequency domain OCC, CDM group, DMRS mapping pattern, antenna ports, DMRS locations (such as which DMRS symbols are used) and a combination of them may be used to associate with the parameter set or associated value(s). Again, there may be a limited number of DMRS choices and after UE detects DMRS, UE can find all the DMRS parameters and obtain the parameter set or associated value(s) using the known DMRS association with the parameter set or associated value(s).

In one example, DMRS association with the parameter set or associated value(s) may be achieved through a fixed mapping between a DMRS index and a parameter set index or associated value(s) index. The DMRS index is an index among a pool of DMRS that can indicate a combination of one or multiple DMRS parameters/properties described earlier. The parameter set index can refer to a known parameter set within a plurality of sets of parameters or known associated value(s) defined by within the parameter pools. For example, if there is 20 DMRS with index p1, p2 . . . p20 there can be a predefined mapping of p1 to parameter set 1, p2 to parameter set 2. Etc. If there is 40 DMRS with index p1, p2, . . . , p40, there can be a multiple DMRS to one parameter set mapping, e.g. p1 and p2 to parameter set 1, p3 and p4 to parameter set 2, . . . etc. For example, the DMRS may be mapped to MCS if there are multiple choices of MCS. In this case, after DMRS is detected, MCS can be determined. An MCS pool may be signaled in the receive resource/resource pool or predefined. MCS pool may include a limited number of potential MCS that can be used for the transmission. In some embodiments, an MCS pool can be indicated as a set of possible indices in a predefined MCS table. Alternatively, MCS can be obtained via blind detection among a small MCS pool. In an example, a UE may try all possible MCS among the MCS pool to decode data until successful.

In some embodiments, DMRS is only used to indicates the transmission after the first transmission. In some embodiment, the pattern is defined/signaled where there is no overlap, in which case DMRS may not even need to indicate the pattern. In some other embodiment, overlap between patterns are used, and DMRS is used to differentiate potential patterns that share the first transmission resource.

DMRS can be used to map to one or more pools of parameters. Alternatively, or in addition, DMRS can be used to directly indicate to a value of a parameter. For example, in some embodiments, the DMRS may be used to indicate a frequency hopping parameter. For example, if a pattern with two transmissions is defined with the location of first transmission along with a frequency hopping offset (in terms of number of RBs or subchannels or PSSCH partitions), DMRS can be used to map the hopping offset.

In another example, RV may be directly indicated by the DMRS. Alternatively, RV may be associated with the number of transmissions in the transmission pattern. The association may be using a predefined RV sequence or RV sequence signaled in the Rx pool. In some embodiments, RV information may be include in the SCI, so a receive UE can obtain it after decoding the SCI. In some other embodiments, SCI may include one or combination of HARQ process ID and new data indicator (NDI). NDI indicates whether the transmission is a new initial transmission or a retransmission. In some embodiments, DMRS may also be used to indicate HARQ process ID. In this scenario, DMRS may be associated with HARQ process ID, so once a UE decodes DMRS, it can find the HARQ process ID. In another embodiment, DMRS may be used to indicate whether the transmission is an initial transmission or retransmission, or just used to indicate NDI. For example, the initial transmission and retransmission may use a different sets of DMRS.

After decoding the data, UE can decode all other parameters that are not needed for decoding. For example, for the source ID, HARQ process ID, feedback channel location, more detailed destination ID, those can be included in the header or just embedded in data transmission.

For the embodiments described, SCI can be much more compact or not used at all, which saves overhead significantly. In addition, the reliability of decoding may be higher especially in the case of contention based transmission.

In some of the embodiments described herein, for the purpose of a UE to UE sidelink transmission, the transmitting UE selects a transmission pattern to use for the transmission. For example, a UE1 may make such a selection from a pool of possible patterns that is configured via RRC configuration.

More generally, the transmitting UE1 is aware of the pool of possible patterns before making the selection. For example, the pool could be pre-configured. More generally still, the transmitting UE may be aware of transmission resources or a pool of SL transmission resources that can be selected for the purpose of sidelink transmission, referred to hereinafter as SL transmission resources. The pool of transmission patterns is one specific example of SL transmission resources.

In some embodiments, the resources that the UE can select between are configured based on a SL communication resource configuration. The SL communication resource configuration can be a pattern (one-dimensional, two-dimensional, also known as time-frequency repetition pattern, etc.), a pool of patterns, a repetition number. For example, the SL communication resource configuration could be pre-configured. The configured/pre-configured SL communication resource configuration may be provided by a device manufacturer or a network operator (e.g., via a subscriber identity module). The SL communication resource configuration may be also provided by the network operator when a UE is in coverage of a base station so that the SL communication resource configuration is available wherever the UE may be, such as when the UE moves out of the network coverage.

In an embodiment of the disclosure, a transmitting UE makes a selection of a SL transmission resource for the purpose of a sidelink transmission based on additional information obtained from decoding sidelink control channels. In some embodiments, this approach is performed only when the UE is out of network coverage. Alternatively, the approach can be employed at any time irrespective of whether the UE is in or out of network coverage.

More specifically, whether the network is involved in scheduling a sidelink transmission or not, a transmitting UE will inform the receiving UE of resources it is using for the sidelink transmission via sidelink control channel (SCI). This can be, for example via previously described SCI, SA, using PSCCH, or some other mechanism. So, for every sidelink transmission, there is a corresponding resource indication on a corresponding sidelink control channel. Note that another UE may transmit an SCI some of the time even when it does not have SL data to transmit. This can also be decoded by the transmitting UE and used to assist in making the selection of the SL transmission resource.

With this embodiment, a given transmitting UE monitors the sidelink control channels of other UEs, and through such monitoring learns of the resources that are being used for sidelink transmissions of other UEs. For example, a UE that is part of a group of UEs may only monitor the SCI resources of other UEs in the group. Alternatively, a UE may monitor all SCI resources configured/pre-configured for the UE. Based on this information, the transmitting UE can make a more intelligent selection of resources for its own sidelink transmission. In some embodiments, the resources for the sidelink control channels are known to the UE. This necessitates that the control information be transmitted in a manner that allows UEs other than the receiver UE to decode it. For example, the control information can be transmitted in an open manner (readable by all UEs), or may be scrambled using a common ID known to a group of UEs.

The sidelink control information may indicate resources being used for a current sidelink transmission, and/or future sidelink transmissions. By monitoring the sidelink control information transmitted by other UEs, a transmitting UE can learn which resources are being used for a current sidelink transmission (based on current sidelink control information that indicates resources being used for a current sidelink transmission), and/or the UE can learn which resources are being used for a current sidelink transmission based on previous sidelink control information that indicated resources being used for a future sidelink transmission that is aligned with the current transmission and/or the UE can learn which resources are being used for a current sidelink transmission based on previous sidelink control information that indicated resources being used for a future sidelink transmission that is not aligned with the current transmission.

Where the sidelink control information for another sidelink transmission indicates a pattern from a pool of patterns, or a resource from a pool of resources, the transmitting UE for a sidelink transmission can avoid selection of that particular pattern/resource. With this approach, collisions can be avoided, and performance can be improved.

Figure 10:
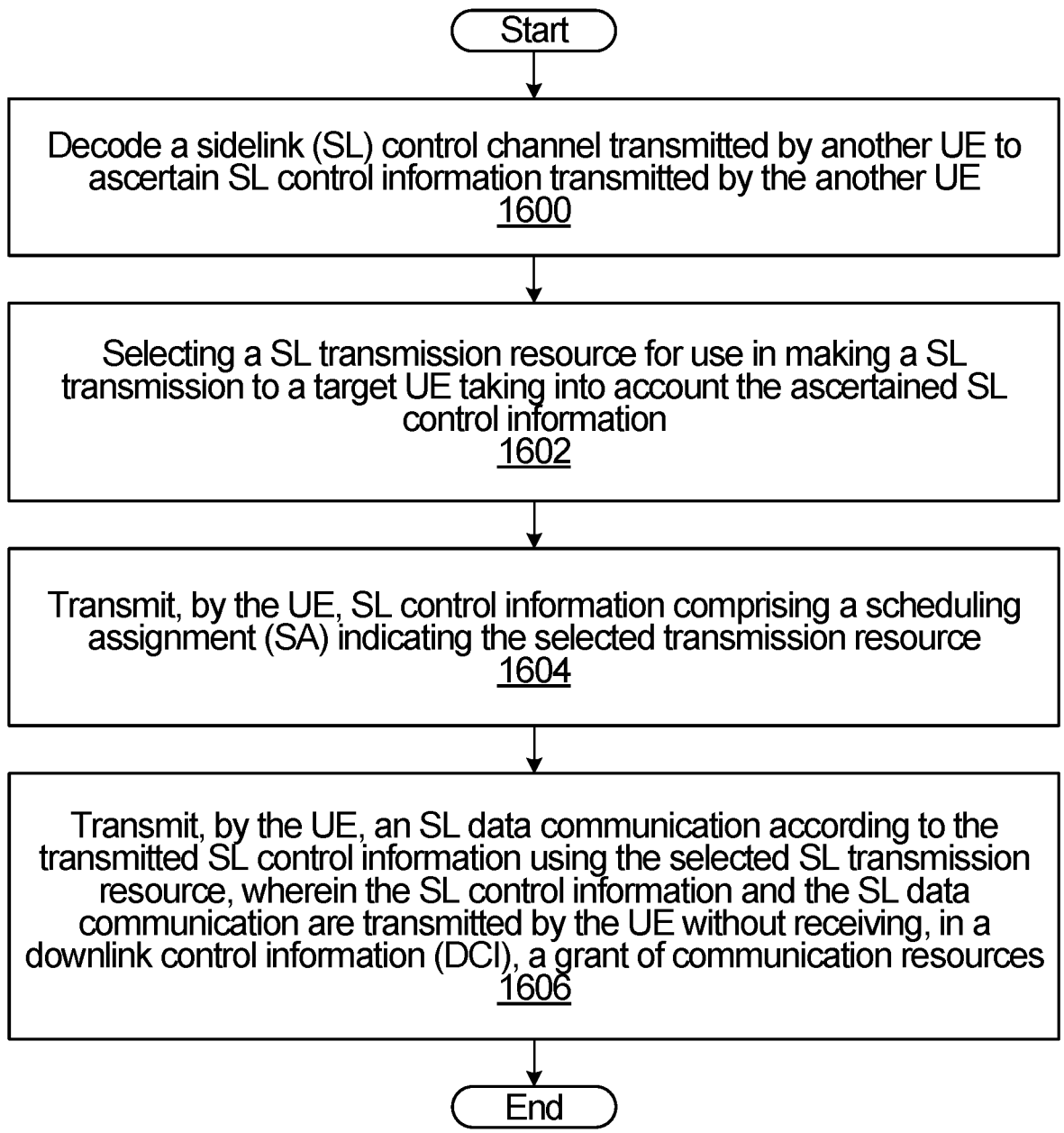

FIG. 10 is a flowchart of a method provided by an embodiment of the disclosure. The method is performed by a UE, and begins in block 1600 with decoding a sidelink (SL) control channel transmitted by another UE to ascertain SL control information transmitted by the another UE. The method continues in block 1602 with selecting a SL transmission resource for use in making a SL transmission to a target UE taking into account the ascertained SL control information. The method continues in block 1604 with transmitting, by the UE, SL control information comprising a scheduling assignment (SA) indicating the selected transmission resource. The method continues in block 1606 with transmitting, by the UE, an SL data communication according to the transmitted SL control information using the selected SL transmission resource, wherein the SL control information and the SL data communication are transmitted by the UE without receiving, in a downlink control information (DCI), a grant of communication resources.

Optionally, the UE may also perform this SCI decoding procedure in order to independently and dynamically select between different grant-free SL configurations.

Figure 11:
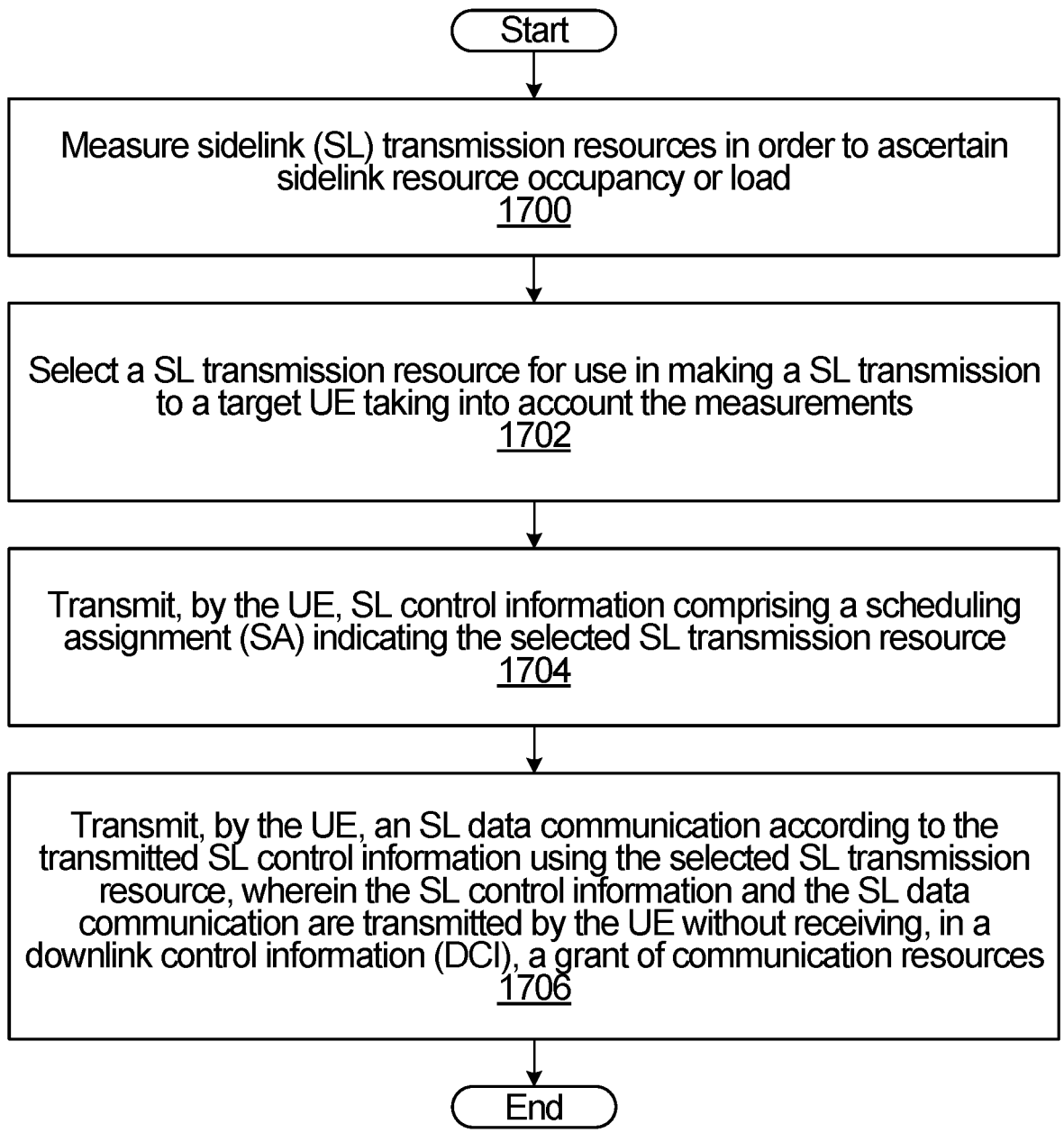

Selection of Grant-Free Transmission Resource Based on Long-Term Sidelink Measurement FIG. 11 is a flowchart of a method provided by another embodiment of the disclosure. The method is performed by a UE, and begins in block 1700 with the UE measuring sidelink (SL) transmission resources in order to ascertain sidelink resource occupancy or load. The method continues in block 1702 with selecting a SL transmission resource for use in making a SL transmission to a target UE taking into account the measurements. The method continues in block 1704 transmitting, by the UE, SL control information comprising a scheduling assignment (SA) indicating the selected SL transmission resource. The method continues in block 1706 with transmitting, by the UE, an SL data communication according to the transmitted SL control information using the selected SL transmission resource, wherein the SL control information and the SL data communication are transmitted by the UE without receiving, in a downlink control information (DCI), a grant of communication resources.

In specific embodiments, the measuring sidelink transmissions resources is performed on a long-term basis or a short-term basis. Detailed examples are provided below.

Selection of Grant-Free Transmission Resource Based on Long-Term Sidelink Measurement In an embodiment of the disclosure, a transmitting UE makes a selection of a transmission resource for the purpose of a sidelink transmission, based on additional information obtained from long-term sidelink measurement. In some embodiments, this approach is performed only when the UE is out of network coverage. Alternatively, the approach can be employed at any time irrespective of whether the UE is in or out of network coverage.

More specifically, whether the network is involved in scheduling a sidelink transmission or not, a transmitting UE will monitor sidelink transmission resources on an ongoing basis. This can involve monitoring a pool of possible transmission resources or a pool of transmission patterns, for example. For example, the UE may measure reference signal receive power (RSRP) or reference signal receive quality (RSRQ) or some other characteristic of signals that might be present on the resources. The measurements may be averaged over a defined period of time to generate a metric for each transmission resource. A higher metric for a given resource is an indication that the given resource is more heavily loaded on average. Then, the UE takes this information into account in making a selection for transmission.

In a specific example, the UE ranks the possible resources according to the calculated metric, and selects the resource with the most favourable metric (which can be the lowest or the highest depending on the nature of the metric). If the metric reflects some measure of average power, the UE would select the lowest metric, as this would reflect the least loaded resource. In another embodiment, the UE can select, for example randomly, from any resource that has a metric below/above a predefined threshold. In another embodiment, the UE can select, for example randomly, from the top X percent of resources that has a metric below/above a predefined threshold where X can be a number less than 100, typically 10 or 20.

A specific example will be described with reference to FIG. 1K. Here, on an ongoing basis, the UE monitors each of the four frequencies F1,F2,F3 and F4, over the five time periods (which are assumed to repeat cyclicly in this example). A metric for each pattern is determined based on this monitoring. For example, for the UE1 pattern, the transmitting UE measures on F1 during T0, and F3 during T1, and produces a metric for the UE1 pattern by combining these measurements. Such measurements are done for each of the patterns. The patterns are then ordered by metric and a pattern is selected based on the ordering. The decision may be based on the metric determined for measurements over a specified window of time, for example over a configured number of time slots, or more generally a configured period of time (which can be configured in terms of a number of time slots or some other basis).

Optionally, the UE may also perform this long-term sensing procedure in order to independently and dynamically select between different grant-free SL configurations.

Selection of Grant-Free Transmission Resource Based on Short-Term Sidelink Measurement In an embodiment of the disclosure, a transmitting UE makes a selection of a transmission resource, for the purpose of a sidelink transmission, based on additional information obtained from short-term sidelink measurement. In some embodiments, this approach is performed only when the UE is out of network coverage. Alternatively, the approach can be employed at any time irrespective of whether the UE is in or out of network coverage.

More specifically, whether the network is involved in scheduling a sidelink transmission or not, a transmitting UE will monitor SL transmission resources on a short-term basis, just before making a selection of a resource for a sidelink transmission. This can involve making a short-term measurement of a pool of possible transmission resources or pool of transmission patterns, for example. For example, the UE may measure energy levels across a specified frequency band(s). The UE may then perform a clear channel assessment (CCA) by comparing the measured energy levels to a specified threshold. The short term measurement allows the UE to assess whether a given resource is being used during a current transmission period. Then, the UE takes this information into account in making a selection for a current transmission.

The measurements can, for example, be similar to those taken with listen before talk (LBT) protocols, which typically include a CCA procedure. In some embodiments, the UE makes the short-term measurements for multiple resources, possibly all, and makes a selection based on the measurements. This can involve determining which of the resources are not being used for a current transmission period, and selecting between those resources. In another embodiment, the UE makes an initial selection of a resource for transmission (possibly based on sidelink control information and/or long-term sidelink measurements) and then makes the short term measurement for the selected resource. If the resource is occupied as indicated by the short-term measurement, the UE makes another selection, or waits a back off time, for example a random back off time, before measuring the same resource again. Once the UE identifies a resource not being used, the UE goes ahead with the transmission using that resource.

A specific example will be described with reference to FIG. 1K. Assume the UE has made an initial selection of pattern UE1. The UE makes a short term measurement of the resources for UE1. If such measurement indicates the pattern is not being used, the UE can go ahead with the sidelink transmission using that pattern. If the short term measurement indicates that pattern is being used, the UE selects a different pattern or waits a random back off time before performing another short term measurement of the resources for UE1.

In some embodiments, the selection of a transmission resource for sidelink transmission is based on a combination of sidelink control information and long-term sidelink measurement.

In some embodiments, the selection of a transmission resource for sidelink transmission is based on a combination of sidelink control information and short-term sidelink measurement.

In some embodiments, the selection of a transmission resource for sidelink transmission is based on a combination of short-term sidelink measurement and long-term sidelink measurement.

In some embodiments, the selection of a transmission resource for sidelink transmission is based on a combination of sidelink control information, long-term sidelink measurement, and short-term sidelink measurement.

Monitoring of transmission resources as described above can also be referred to as sensing, and this can include short-term measurements and/or long-term measurements.

Optionally, the UE may also perform this short-term sensing procedure in order to independently and dynamically select between different grant-free SL configurations.

Adaptive Adjustment of Grant-Free Resources Based on Sensing and/or Decoding of Sidelink Control Channel In some embodiments, the resources available for SL transmission are adaptively adjusted in some manner based on the sensing and/or decoding of sidelink control channel. Note this is a distinct step compared to selecting the resource for sidelink transmission. In some embodiments, this approach is performed only when the UE is out of network coverage. Alternatively, the approach can be employed at any time irrespective of whether the UE is in or out of network coverage.

The adjustment may encompass adjusting one or a combination of:
   the number of repetitions;
   the size of a transmission pattern;
   the location of a transmission pattern;
   some other parameter or combination of parameters.

For example, a UE may be configured with a set of patterns that includes a first subset that have a first number of repetitions, and a second subset that have a second number of repetitions. Based on the sensing and/or decoding of sidelink control channel, the UE can change the number of repetitions, by changing from selecting among the first subset to selecting among the second subset.

Alternatively, the set of patterns may initially only include patterns with two repetitions, but the UE can extend each of those patterns to include three repetitions. Once the transmission resources are adjusted, the UE makes a selection for a given SL transmission based on the adjusted transmission resources.

For example, a first subset of patterns UE1, UE2, UE3 may contain 2 repetitions, and a second subset of patterns UE4, UE5, UE6 may contain 3 repetitions. Depending on sensing and/or decoding of sidelink control channel, the UE can select between the first subset of the second subset.

Similarly, subsets of patterns can be defined which differ in size or location or some other parameter. An adjustment can be made by selecting from the appropriate subset of patterns.

Alternatively, starting with a pattern, or a pool of patterns, the UE can make adjustments to the pattern or the pool of patterns to produce an adjusted pool of patterns. Again this can, for example, involve adjusting the number of repetitions, size, location, or some other parameter or combination of parameters of the selected pattern.

Figure 12:
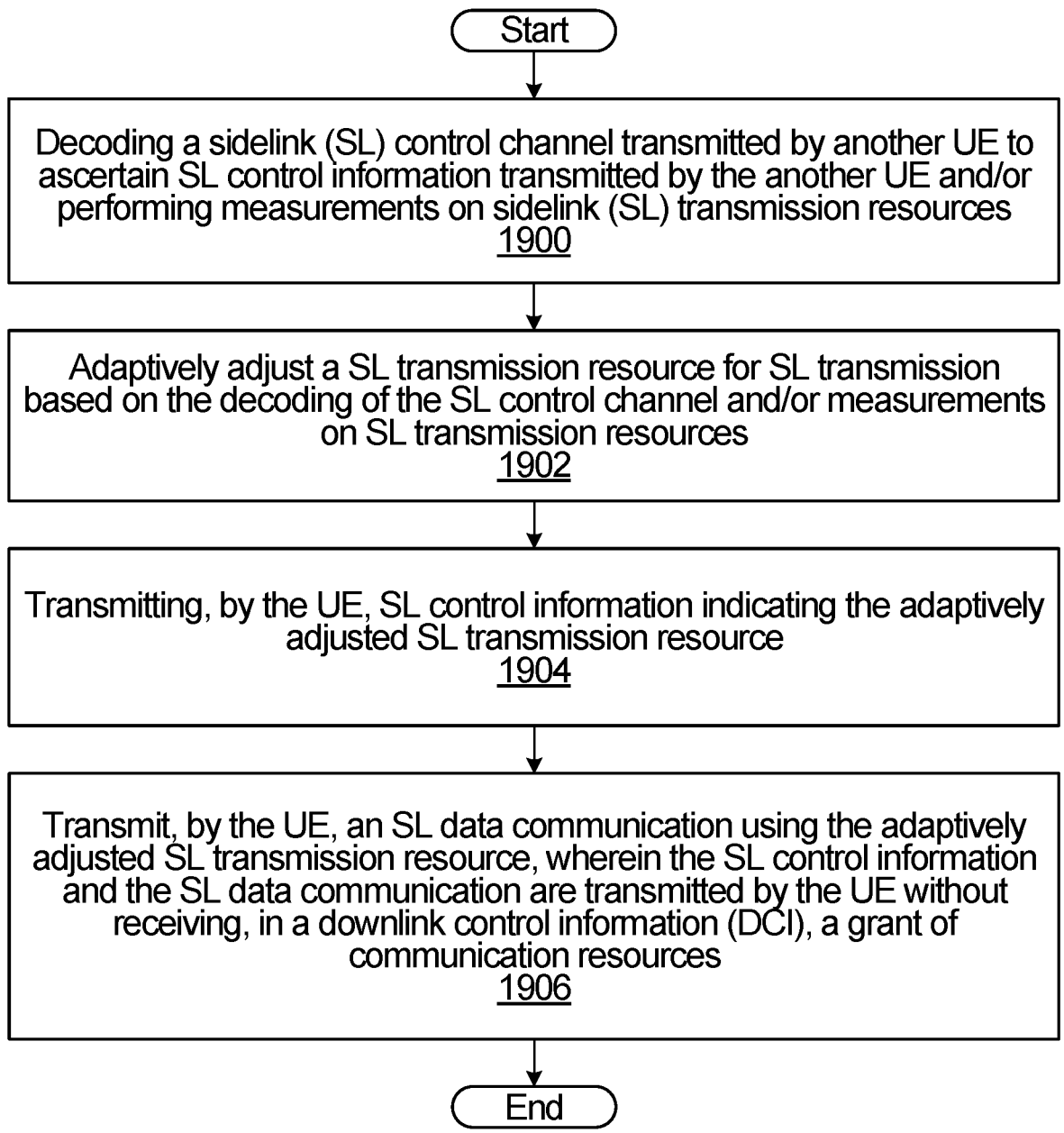

FIG. 12 is a flowchart of a method provided by an embodiment of the disclosure. The method is performed by a UE, and begins in block 1900 with decoding a sidelink (SL) control channel transmitted by another UE to ascertain SL control information transmitted by the another UE and/or performing measurements on sidelink (SL) transmission resources. The method continues in block 1802 with adaptively adjusting a SL transmission resource for SL transmission based on the decoding of the SL control channel and/or measurements on SL transmission resources. The method continues in block 1804 with transmitting, by the UE, SL control information indicating the adaptively adjusted SL transmission resource. The method continues in block 1906 with transmitting, by the UE, an SL data communication using the adaptively adjusted SL transmission resource, wherein the SL control information and the SL data communication are transmitted by the UE without receiving, in a downlink control information (DCI), a grant of communication resources.

Information Contained in Sidelink Control Channel

For any of the embodiments described herein, the sidelink control channel may transmit a scheduling assignment which may include a resource allocation, such as a pattern indicator for a sidelink transmission. In some embodiments, the sidelink control information also includes: a power level for the sidelink transmission, an interference measurement, and/or a spatial beam direction. This is included so that other UEs (other than the target UE for that sidelink control information) can observe the power level, and factor this in when selecting a transmission resource for their own SL transmissions. For example, where the sidelink control information indicates a sidelink transmission on a transmission resource with high power, this would weigh against selecting that transmission resource, possibly disqualifying it from selection.

least one transmission of the TB by the other UEs.

Embodiments Making Use of Reference Symbol for Pattern Indication

For V2X transmission, it is important to indicate the transmission pattern, or more generally, the time frequency resource for the SL data transmissions. The receiver UE may be able to use the information from the pattern indication to do decoding of data, combining data from different transmissions or choosing its own transmission or transmission pattern to avoid collision with the detected pattern.

As indicated above, one existing way to indicate the transmission pattern is to indicate it in sidelink control information (SCI) transmitted in a sidelink control channel. SCI may be associated with one or more of the SL data transmissions. However, including the information in the SCI may incur significant overhead.

In accordance with some embodiments of the disclosure, a non-control signal based transmission resource indication signal (NCSBTRIS) is transmitted to indicate transmission resources, for example a transmission pattern, for a sidelink transmission.

In some embodiments, the NCSBTRIS is a reference signal, such as a demodulation reference signal (DMRS). Other specific examples of reference signals that can be used for the NCSBTRIS include sounding reference signal (SRS), channel state information (CSI)-RS.

In some embodiments, the NCSBTRIS is a preamble.

In some embodiments, the NCSBTRIS is a synchronization signal.

All of these examples of NCSBTRIS have other purposes, such as purposes related to channel measurement, channel estimation or synchronization but here are also used to implicitly indicate the transmission pattern.

In the following description, the assumption is that the NCSBTRIS is a DMRS, and various options for using the DMRS are provided. It should be understood that these same options apply to the other signals that might be used for the NCSBTRIS, including other reference signals, preambles, and synchronization signals.

In some embodiments, to indicate the transmission pattern, DMRS has a predefined or a configured mapping/association to the pattern. The association/mapping between DMRS or DMRS parameters and the transmission pattern (or transmission pattern index) may be predefined. The association/mapping may also be configured to the UE through signaling (e.g. through RRC signaling, system information or preconfigured to the UE). With the mapping, if a UE detects a DMRS, the UE can then derive which pattern the transmitter is using. The mapping that is used to associate DMRS to specific patterns may be based on one or a combination of DMRS sequence, different roots/initialization for the DMRS sequence, different cyclic shift values, DMRS time and frequency locations (e.g. different symbols), different orthogonal cover code used, different antenna ports, different code division multiplexing (CDM) groups, different DMRS patterns or some other aspect of the DMRS.

DMRS is mainly used for channel estimation. An example of DMRS can be the DMRS used in 3GPP NR uplink described in 3GPP TS 38.211 V15.0.0. Another example of DMRS would be the UL DMRS used in LTE. In SL transmission, similar DMRS structure as LTE or NR uplink may be used. DMRS can be generated using a sequence, such as gold sequence (or m-sequence) or Zadoff Chu sequence. The sequence is usually calculated using a root or an initialization value. The sequence may be further applied with a phase shift (some time called a cyclic shift). For example, in LTE, a phase shift is applied to the Zadoff Chu sequence used for uplink DMRS, and the phase shift is usually called cyclic shift and can be indicated using a cyclic shift value or cyclic shift index. In LTE, the value of cyclic shift is indicated in DCI as one of 8 possible choice of cyclic shift value using 3 bits.

The sequence may be further multiplied using an orthogonal cover codes (OCC). The sequence may be further precoded and then mapped to time frequency resources and modulated to a reference signal and transmitted over the air. Orthogonal cover codes may include orthogonal cover codes applied to time domain or frequency domain. DMRS sequence may be also applied to time frequency locations (e.g. in different resource elements) with different allocation patterns. DMRS signal transmitted from the same time frequency resource may interfere with each other, therefore it is desirable to design different DMRS that can multiplexed together with minimum interference to each other. This can be achieved by using DMRS sequence with low correlation among each other. Another way to achieve multiplexing of different DMRS is to use code division multiplexing (CDM), time division multiplexing (TDM) or frequency division multiplexing (FDM). Orthogonal cover codes are an example of CDM. Different allocation patterns (map DMRS sequence to different time frequency locations) to create different DMRS can be considered TDM or FDM. In some scenarios, the combination of different DMRS properties may be characterized by a single DMRS parameters, for example in new radio (NR) cellular system, different CDM, TDM, FDM patterns and different OCC used may be indicated using a single parameter as antenna port. The combination of DMRS sequence, different allocation patterns (TDM, FDM), different orthogonal cover codes used (different CDM pattern) and different DMRS locations together generates different DMRS.

The DMRS parameter may be known by the UE, then UE can detect DMRS without blind detection. In some case, the exact DMRS parameter may not be known by the UE. In this case, UE can blind decoding DMRS to find which DMRS and which DMRS parameters are used. There is usually a finite choice of DMRS parameters that are known to the UE. An example way to do DMRS detection is to use different choices of potential DMRS sequences to correlate with the DMRS at the potential location of DMRS and find which one gives the highest correlation by finding the output signal with the highest energy.

For example, in 4G LTE, a Zadoff-Chu (ZC) root sequence may be used to generate a pool of DMRS sequences generated according to the following formula $$X_{m,k}^{ZC} = e^{-j\pi q \frac{k(k+1)}{M_{ZC}}}, 0 \leq k < M_{ZC}.$$

Where M_{zc} is the length of the root sequence, q is the index of the reference Zadoff-Chu sequence or the root of the sequence. The reference pilot sequence of given length is the cyclic extension of the original Zadoff-Chu sequence. The cyclic shift (phase rotation in frequency domain) of the reference sequence creates multiple orthogonal pilot sequences: $X_k = C_k^{ZC} e^{-j\alpha k}$, In LTE $\alpha=2m\pi/12$, $m \in \{0,$ 1, . . . , 11\}. An orthogonal cover codes may be applied to the two symbols used for DMRS for each subframe. In this scenario, the root q, cyclic shift value alpha, and the orthogonal cover codes used are all properties of the DMRS. And UE can do DMRS detection and find out which root, which cyclic shift value and which orthogonal cover codes are used. And one or a combination of these properties (roots, cyclic shift and orthogonal cover codes) may be associate with the transmission pattern. After receiving UE detecting the DMRS, UE knows the transmission pattern that the UE who transmit DMRS use by using the association between DMRS and the transmission pattern.

In another example, in NR, if transform precoding for PUSCH is not enabled, the reference-signal sequence r(m) shall be generated according to $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is a defined by a length-31 Gold sequence and initialized using some given parameters. There are limited number of gold sequences that can be used to generate the DMRS. After precoding, the sequence is mapped to the time frequency resource using the following:

The UE shall map the sequence $\tilde{r}^{(p_j)}(m)$ to physical resource elements according to $$a_{k,l}^{(p_j,\mu)} = \beta_{DMRS} w_f(k') \cdot w_t(l') \cdot \tilde{r}^{(p_j)}(2n+k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

where $w_f(k')$, $w_t(l')$, and $\Delta$ are given by the specification defined in 3GPP TS 38.211, one of the example table for a configuration type is shown below.

TABLE 6.4.1.1.3-1

Parameters for PUSCH DM-RS configuration type 1.

| p | CDM group | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

Here Δ value represents different DMRS time-frequency mapping patterns or different TDM/FDM scheme (FDM for this particular example where different value represents mapping to different subcarriers), which also corresponds to different CDM group in this example. $w_f(k')$ and $w_t(l')$ are frequency domain and time domain orthogonal cover codes used. They are all determined using a single antenna port value p that can be indicated to the UE. The different gold sequence, orthogonal cover codes (OCC), different mapping pattern together generates different DMRS. And all the DMRS properties, such as different sequence, time and frequency domain OCC, CDM group, DMRS mapping pattern, antenna ports, DMRS locations (such as which DMRS symbols are used) and a combination of them may be used to associate with the transmission pattern. Again, there may be a limited number of DMRS choices and after UE detects DMRS, UE can find all the DMRS parameters and obtain the transmission pattern information using the known DMRS association with the pattern.

An example of transmission pattern in a given time frequency grid is shown in the FIG. 3A, where the same VUE index in the figure represents a pattern and VUE index is the pattern index. In the example, there are 20 patterns that do not overlap with each other in such a 10 time slots×4 frequency partitions grid.

In one example, DMRS association with the pattern may be achieved through a fixed mapping between a DMRS index and a pattern index. The DMRS index is an index among a pool of DMRS that can indicate a combination of one or multiple DMRS parameters/properties described earlier. The pattern index can be a known pattern among a pattern pool. For example, if there is 20 DMRS with index p1, p2 . . . p20 there can be a predefined mapping of p1 to pattern 1, p2 to pattern 2. Etc. If there is 40 DMRS with index p1, p2, . . . , p40, there can be a multiple DMRS to one pattern mapping, e.g. p1 and p2 to pattern 1, p3 and p4 to pattern 2, . . . etc.

In some embodiment, DMRS may have a fixed association/mapping with the transmission pattern or the time frequency location of the transmissions other than the first transmission of the TB. In some embodiment, DMRS may have a fixed association/mapping with the transmission pattern or the time frequency location of the transmissions other than the first transmission of the TB given the time frequency location of the first transmission of the TB is known.

For example, in some scenario, the first transmission may already be known by the UE and UE may only need to know the location of the rest of transmissions of the TB to do combining to decoding the signal. UE can know the first transmission through decoding of SCI, DMRS, which is associated with a data transmission. In this case, DMRS may only need to map to the pattern of the remaining transmissions given the first transmission. In the pattern pool defined in FIG. 7 above, once UE find an initial transmission, the location of the second transmission is already determined, so detecting DMRS may not even be needed to find the location of the second transmission.

Figure 3B:
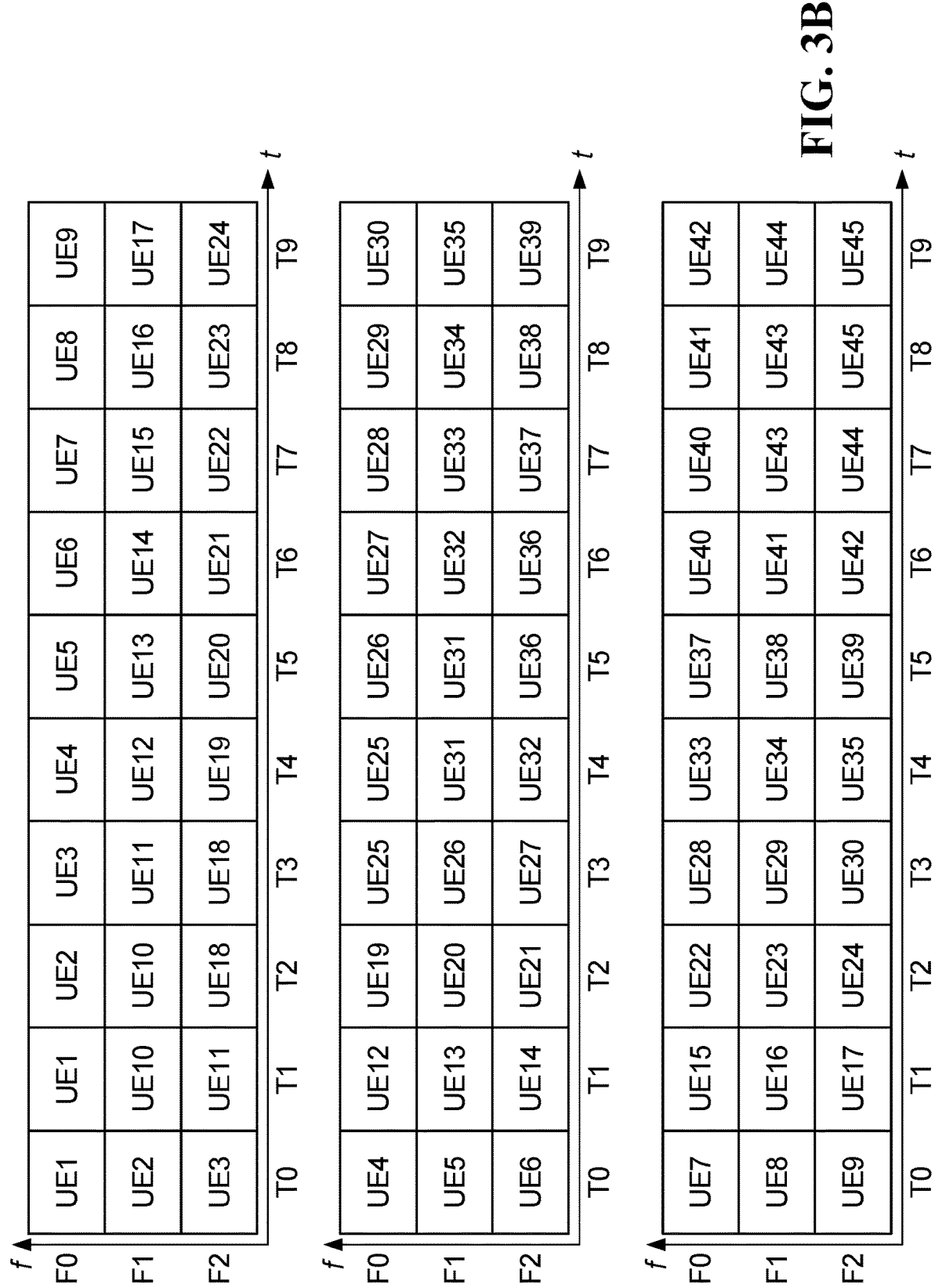
FIG. 3B is an example of a partially overlapping TFRP pool.

In another example, the pattern pool is defined as in FIG. 3B, where the pattern are partially overlapped with each other. In every time frequency resource, there are 3 possible patterns. In this case, if a UE find a first transmission through decoding SCI or DMRS, there may be 3 possibilities of transmission pattern or location of second transmission given the location of the first transmission. In this case, 3 DMRS or DMRS groups may be enough to indicate all possible transmission patterns. For example, DMRS with index p1 or DMRS in group 1 may indicate or have a fixed association of patterns in the top figure of FIG. 3B. DMRS with index p2 or DMRS in group 2 may indicate or have a fixed association of patterns in the middle figure of FIG. 3B. DMRS with index p3 or DMRS in group 3 may indicate or have a fixed association of patterns in the bottom figure of FIG. 3B.

After obtain the pattern information through DMRS mapping, UE can combine the signal from different transmissions through pattern information to decode the signal. This is most useful in the case where the signal is targeting to the UE himself. If the signal is not targeting the UE, UE may use the pattern information to avoid collision with the UE who send the DMRS or pattern indication signal.

In some embodiments, a single pattern can be mapped to multiple DMRS, so a UE may use different DMRS even if it uses the same pattern. The mapping between DMRS and pattern may be predefined or configured by the base station or the network.

In some embodiments, a UE is preconfigured/-configured/predefined with a DMRS pool and the UE randomly selects a DMRS from the DMRS pool. Alternatively, a UE may be configured/preconfigured with a specific DMRS. A DMRS pool/specific DMRS may be defined among the DMRS mapped to the same pattern that is to be indicated using the DMRS.

When multiple DMRS are mapped to the same transmission pattern, to indicate a given transmission pattern, a UE may randomly select the DMRS among the DMRS that can mapped to the pattern.

In some embodiments, a UE also uses multiple transmissions of the same DMRS or a DMRS tuple (a number of DMRS used for multiple transmission/repetitions) for repetition identification for soft combining. For example, repetition of the same transport block (TB) may use the same DMRS or a predefined configured DMRS tuple. DMRS may also be used to indicate redundancy version (RV). So once a UE detects the DMRS, the UE also knows how to combine the repetitions.

An example of DMRS tuple associated with retransmission is shown in the Table below, where p11, p21, . . . , p33 are DMRS index. If a UE detects a P11 DMRS, p21 DMRS, p31 DMRS at different time frequency locations, they knows that they corresponds to the initial transmission, $1^{st}$ retransmission or repetition of the TB, $2^{nd}$ retransmission or repetition of the same TB and can combine all 3 transmissions to decode the data signal in sidelink transmission.

| Index for 3-tuple | {p1} Initial | {P2} 1 reT | {P3} 2reT |
| --- | --- | --- | --- |
| 1 | P11 | p21 | p31 |
| 2 | P12 | p22 | p33 |
| 3 | P13 | p23 | p33 |

In some embodiments, the signal that is used to indicate the transmission pattern is transmitted contemporaneously with data transmission. For example, DMRS may be transmitted at the same time or in the same slot as data transmission. In other embodiments, the signal that is used to indicate the transmission pattern is transmitted in advance indicate the transmission pattern. An advance indication signal may be transmitted before the signal transmission occurs, so other UE may detect the indication signal and use it to avoid a conflict. An advance indication signal can be a preamble, a sequence, a RS, a reservation signal, a dedicated transmission pattern indication signal to name a few specific examples. In some embodiments, the advanced indication signal may be considered a control signal.

Advantages of using DMRS to indicate transmission pattern includes at least:
A reduction in overhead: Depending on the total number of patterns, transmitting the transmission pattern information in the SCI may use significant overhead for reliable transmission of SCI. Using DMRS to indicate the pattern can reduce the overhead;

Reliability: Also DMRS may be more reliable and can be easily detected even if there are two UEs using the same resource;

Other UE can quickly decode DMRS to obtain the pattern information.

In another embodiment, a dedicated transmission resource indication signal is used to indicate a transmission resource, such as a transmission pattern, separate from any SCI associated with a specific transmission.

Note that a transmission pattern indicated in an SCI is different than a NCSBTRIS or a dedicated transmission resource indication signal. SCI is a control channel that is associated with a specific SL data transmission, it usually contains information regarding the data transmission such as scheduling information, transmission parameters or source/destination ID.

In contrast, a dedicated transmission resource indication signal does not directly associate with one SL data transmission; rather, the dedicated transmission resource indication signal serves to indicate a transmission pattern for an indefinite number of transmissions subsequent to the indication.

Decoupling the dedicated transmission resource indication signal from a data transmission has a practical benefit over using SCI to indicate the transmission resource(s). If the dedicated transmission resource indication signal is transmitted sufficiently in advance of a data transmission, a receiver may decode the dedicated transmission resource indication signal early enough to avoid data transmission collisions. In contrast, a transmission resource indication over SCI may be insufficiently in advance of the data transmission (which in most cases are defined to be in the same time slot as the SCI) to guarantee that no collision will occur on the data transmission.

The dedicated transmission resource indication signal may be transmitted in a channel separate from the SCI's physical sidelink control channel (PSCCH). For example, this separate channel may be a channel specifically defined for the dedicated transmission resource indication signal; alternatively, this dedicated transmission resource indication signal may be transmitted in a data channel, such as a physical sidelink shared channel (PSSCH).

The dedicated transmission resource indication signal may also be known as a reservation signal. For example, a reservation signal is used for reserving multiple repetitions of a transport block. The dedicated transmission resource indication signal could act as a reservation signal by configuring the repetitions to be the transmission resources or transmission pattern defined by the dedicated transmission resource indication signal.

The dedicated transmission resource indication signal may explicitly or implicitly indicate the transmission resources or transmission pattern. An explicit indication comprises different bit values being uniquely associated with different transmission resources or transmission patterns.

Alternatively, an implicit indication may comprise a sequence index or sequence time-frequency location that is uniquely associated with different transmission resources or transmission patterns. For example, receiving an implicit dedicated transmission resource indication signal involves a UE receiving a certain information sequence. The index and/or time-frequency location of the received sequence is associated with a predefined transmission resource or transmission pattern, allowing the UE to implicitly determine the transmission resource or transmission pattern to be used.

Window for Advanced Transmission of Transmission Pattern Indication Signal

In some embodiments, a specific window is defined for advanced transmission of transmission pattern indication signal. Referring now to FIG. 2C, shown is an example of advance transmission of a signal to indicate a transmission pattern. A transmission period T2 is divided into a first period 200 between time 0 and time T0, and a second period 202 between T0 and T2. The first period 200 is available to transmit the transmission pattern indication, referred to as the indication signal window, and the second period 202 is available for data transmission using an indicated transmission pattern, referred to as the data transmission window. T0 and/or T2 may be predefined and known to the UE or configured/preconfigured to the UE.

A fixed indication period T0 within T2 is defined for transmission of the advanced indication signal. In some embodiments, for transmitting the indication signal, the UE randomly selects a resource from a set of possible resources (for example a set of possible time frequency resources and/or code resources) within the indication signal window to send the indication signal. Once UE detects the signal, e.g., find out which sequence is used to transmit the indication signal, UE can find out the transmission pattern that the UE who send the signal plan to use. Additionally, or alternatively, UE may also be configured/preconfigured with a specific time-frequency or code resource within the indication signal window to transmit the indication signal.

In addition, a UE monitors and detects the indication signal(s) transmitted by other UEs within the indication signal window. Based on the detected indication signal(s), the UE can determine the transmission patterns being used by the other UEs. In some embodiments, after the UE detects other indication signals within the indication signal window, the UE then selects a transmission pattern based on avoiding collision with other UE's transmission patterns.

In some embodiments, the transmission pattern pool is defined based on a rule where a first transmission is within a first window, and any retransmissions or further repetitions are in a following window. For example, the first window may have a duration T1, and the second window may have a duration T2−T1, where T2 is the total duration of the first and second windows. An example is shown in FIG. 2D which shows an initial transmission window 320 and a remaining repetition window 322. T1 and/or T2 may be predefined and known to the UE or configured/preconfigured to the UE.

A reference signal such as DMRS, synchronization signal, preamble or SCI or some other indication is used to indicate the transmission pattern used for an initial transmission in the initial transmission window. This indication is transmitted at the same time, same slot or simply insufficiently in advance of the data transmission to allow other UE to avoid collision as the initial transmission. Since the indication is sent at the same time as the data for the first transmission, the transmission pattern for the first transmission is not indicated in advance. As such, another UE may not have time to avoid collision with the associated data transmission after detecting the corresponding indication signal. However the initial transmission window 320 can be used as a sensing window for sensing indications transmitted by other UEs so that the UE can attempt to avoid/increase the probability of avoiding collision for the following repetitions during the remaining repetition window 322. When the window is defined such that all the transmission pattern has the first transmission within window T1, UE only need to monitor the initial transmission within window T1 (through DMRS detection, SCI detection etc.) to obtain the information of retransmissions of the TB for other UEs. Therefore, UE can avoid all the collisions in the second window as no UE is doing initial transmission in the second window while all the intention for retransmission in the second window is detected/known through sensing in the first window with T1 Transmission Pattern Selection Some embodiments of the disclosure provide methods of selecting a transmission pattern for a sidelink transmission, when the UE has the freedom to select between multiple transmission patterns. The methods include steps of configuring transmission patterns, initialization/pattern selection, pattern indication, and sensing transmission patterns used by other UEs so as to enable the UE to avoid selecting a transmission pattern that is already being used.

Configuration: a UE may have a default transmission pattern or be configured with an initial transmission pattern. A UE may be additionally configured/preconfigured with a transmission pattern pool. The configuration parameters may include one or more of: periodicity, pattern window length, repetition number, time-frequency size of each transmission, and/or other configuration parameters. Periodicity is the periodicity of the resources configured for the UE. Pattern window length is length of windows for patterns transmitted within one TB, example of pattern window length is the time between T0 to T4 or 5 slots for FIG. 3. Repetition number is the number of repetitions/transmission for each transport block (TB). Time frequency size is the size of time frequency resources, e.g. number of slots, RBs or subchannels used for one SL data transmission.

Initialization: a UE may use a default or configured initial transmission pattern as a first selected transmission pattern. Alternatively, if a UE is not configured with an initial pattern, the UE may be randomly select a transmission pattern among pattern pool.

Pattern indication: When the UE transmits a sidelink data signal using the selected transmission pattern, the UE may also indicate the pattern, using any of the previously described methods. The indication may be transmitted during the data transmission (e.g. DMRS) or in advance. Alternatively, for this embodiment, the pattern may be indicated in an SCI. Apart from indicating the transmission pattern, SCI may include the general time-frequency resource of the transmission, the indication may further include one or more of periodicity information and reservation (e.g. m TBs to be transmitted in burst) and a priority value. In some other embodiment, SCI may not include time-frequency resource or any scheduling information such as MCS for the SL data transmission. The m TB refers to that the UE plans to transmit m times or m TBs in m resources that any two neighbor resources are spaced apart by a time distance defined by periodicity. Each of the m resources for m TB may include more than 1 transmissions of the TB and therefore can have more than 1 resources. UE may decide to transmit m times and indicate it because the packets in the buffer may need to be transmitted m time. The priority value indicates how important the transmission with respect to other UEs transmissions is.

Sensing: Various sensing procedures are provided. In some embodiments, a UE may do measurement through reference signal received power (RSRP) of data signal, DMRS or SCI, received signal strength indication (RSSI) of data signal, DMRS or SCI or through detection of DMRS sequences, or energy to determine the approximate usage at different possible transmit resources. Based on these measurements, the UE selects a transmission pattern for sidelink transmission. For example, if for one transmission pattern, there is too much transmission or too high an amount of energy detected, the UE may select a different transmission pattern.

In some embodiments, a UE detects the transmission pattern indication signal (DMRS/preamble/advanced indication signal) or detects an SCI to obtain an indication of the transmission patterns used by other UEs. The UE may also obtain one or more of periodicity, m reservation and priority information if included in the transmission pattern indication signal and/or SCI. If the UE has selected a transmission pattern that collides with one of the patterns determined from the transmission pattern indication signal or SCI, the UE may re-select a pattern among the remaining patterns in the pattern pool.

Note that for sensing, a UE may monitor/detect the indication signal in different windows. For example, for the advanced indication signal, a UE may detect them within a first window of duration T0 as described with reference to FIG. 2C. For the design in FIG. 2C where there is a first transmission having duration T1 during which the indication signal and initial transmissions are transmitted, the UE may detect the indication signals of other UEs within T1 and determine a transmission pattern (for one or more remaining transmissions) within T2.

In some embodiments, the UE is configured to avoid all the transmission patterns it detected within a predefined sensing period. This may be used with or without a condition that the priority of the detected UE is higher than the priority assigned to the UE itself. An example is that the UE detects an indication (e.g. through SCI or DMRS detection) that the transmitting UE plans to transmit m times with periodicity P1, UE may consider any resources located in t+P1*n, where t is the current time, n is the integer between 1 and m a potential resource that used by the transmitting UE therefore may collide if the UE use the same resource. In another embodiment, if a UE B detects a pattern used by UE A through any of the method described within a predefined time window before transmission, even if UE A does not reserve another m resources, UE B may assume UE A may keep using the same pattern and therefore try to avoid use the same pattern in a certain number of subsequent transmissions. Alternatively, UE A may only avoid such potential collision if UE B indicates a higher priority than UE A's transmission priority, which may be predefined or configured or simply known by the UE.

In some embodiments, the UE performs short term sensing immediately before the transmission and determines whether it should perform the transmission or delay the transmission.

For any of the embodiments described above, if changing the transmission pattern can avoid collision, UE may change the pattern. Otherwise, UE may use the same selected pattern for the next transmission.

All of the embodiments described herein focus on the use of transmission patterns. Various embodiments rely on one or more of NCSBTRIS, advanced indication signal (which may be NCSBTRIS or dedicated pattern indication signal, or DCI to indicate the transmission resource for a sidelink transmission. Transmission patterns were introduced above, and examples shown in FIGS. 1A to 1K While the embodiments described have focused on the use of NCSBTRIS or dedicated pattern indication signal or DCI to indicate a transmission pattern, such signals are used to indicate transmission resources, for example, time frequency resources to be used for a sidelink transmission. An indication of a transmission pattern is a specific example of an indication of transmission resources.

In another embodiment, a dedicated transmission resource indication signal is used to indicate a transmission resource, such as a transmission pattern, separate from any SCI associated with a specific transmission.

Note that a transmission pattern indicated in an SCI is different than a NCSBTRIS or a dedicated transmission pattern indication signal. SCI is a control channel that is associated with a specific SL data transmission, it usually contains information regarding the data transmission such as scheduling information, transmission parameters or source/destination ID.

in contrast, a dedicated transmission pattern indication signal does not directly associate with one SL data transmission, but it indicates a transmission pattern for transmissions subsequent to the indication.

The embodiments described mainly use grant-free or configured grant in NR V2X mode 2 as an example, however, the same approaches can also be used for other transmission modes or methods. For example, these approaches may be applicable to UE autonomous transmission based on long term or short term sensing mode, configured grant transmission in Mode 1 etc.

Sending Pattern Using a Reservation Signal

The pattern indication signal or dedicated pattern indication signal or advanced pattern indication signal can be also be considered a reservation signal. As the function of such indication is to indicate or reserve the transmission resource used for transmission data in the resource defined by the transmission pattern. UE may send such reservation signal to indicate the transmission pattern or time frequency location/resource of the transmission used for one TB. In some embodiment, the reservation signal may indicate only the retransmission resources.

In some embodiment, the reservation signal is only used to indicate or reserve a single transmission pattern or to reserve one or multiple transmissions of a TB. In some embodiment, the reservation signal is used to reserve/indicates using resources for one transmission pattern or transmission of one TB. For example, if UE reselect patterns for each TB, then the reservation signal can be just for transmission of one TB. In some embodiment, the reservation signal is used to reserve/indicates using resources for resource used for multiple transmission patterns or resource used for multiple TBs. As an example, when UE reserve m TBs or resource for m TBs, UE may send a reservation signal to indicate so. In some embodiment, the reservation signal is to indicate or reserve the use of resources for the transmission pattern. UE may continue use the same transmission pattern until a reselection is triggered. The number of TBs that the UE use based on the transmission pattern may not be predetermined and indicated in the reservation signal.

In some embodiment, UE may send reservation signal for transmission of each TB. In some embodiment, UE may send the reservation signal in advance with respect to the data transmission such that other UE may avoid the collision after detecting the reservation signal. In some embodiment, the reservation signal is sent in the particular window or area defined for the reservation signal, such as the example described in this disclosure, where reservation signal or pattern indication signal is sent within a predefined window [0, T0] inside a transmission pattern window. In some embodiment, the reservation signal can be sent in any location or can be sent at other locations other than the predefined window.

UE may be configured with a pool of transmission resources, and perform long term or short term sensing to select the resources. The sensing scheme may include channel measurement, detection of SCI, DMRS, or simply energy of the SL transmission. The measurement may include measure of reference signal received power (RSRP), received signal strength indication (RSSI) and any other measurement for energy or power detection. In some embodiment, UE may send a reservation signal that indicates the transmission pattern or simply the resources for transmission of a TB if it sense some potential collision. For example, UE may select a resource or multiple resources for transmission of a TB in a resource selection window based on long term sensing. UE may further perform short term sensing or listen before talk type sensing scheme to further check for collision before the transmission. If UE find a potential collision through short term sensing on the resources, UE may reselect a resource or resources for transmission of a TB and send a reservation signal to indicate the resource or transmission pattern. In another embodiment, UE may keep perform short term sensing until it decides to transmit at certain resource or pattern, UE may send a reservation signal before the transmission such that no other UE may occupy the same resources.

UE may be configured with a pool of transmission pattern and/or an initial/default transmission pattern. UE may perform sensing (long term and/or short term) sensing to sense other UE's transmission resource or transmission pattern to help select the pattern. The sensing scheme may include channel measurement, detection of SCI, DMRS, or simply energy of the SL transmission. The measurement may include measure of reference signal received power (RSRP), received signal strength indication (RSSI) and any other measurement for energy or power detection. The sensing technique can be any techniques described in this disclosure. The pattern selection methods described in this disclosure can be examples. If a UE sense a potential collision with its intend transmission or transmission pattern, UE may reselect a transmission pattern from a previously used pattern. UE may send the reservation signal to indicate the new transmission pattern it plan to use. In some embodiment, UE keep using an initial or default transmission pattern unless it sense a potential collision, in which case, UE may reselect a transmission pattern and send a reservation signal for the new transmission pattern. In another embodiment, UE may select a pattern among the pattern pool, UE may keep the same pattern unless it detects a potential collision from sensing, in which case, UE may select a new pattern and send a reservation signal to indicate a new pattern. In another embodiment, UE may keep perform short term sensing until it decides that it can transmit using a specific transmission pattern, UE may then send a reservation signal before the transmission such that no other UE may occupy the same resources.

In some embodiment, UE may send the reservation signal for transmission of each TB. In some embodiment, UE may only send the reservation signal if during sensing procedure (long term or short term), it discover a potential collision and select a new transmission pattern. In which case, UE may first send a reservation signal for the new transmission pattern that it is going to use. In some embodiment, UE may send the reservation signal once. In some embodiment, UE may keep sending reservation signal until the actual data transmission begins so other UE can sense that the channel has been occupied.

Apparatus Descriptions

Figure 4:
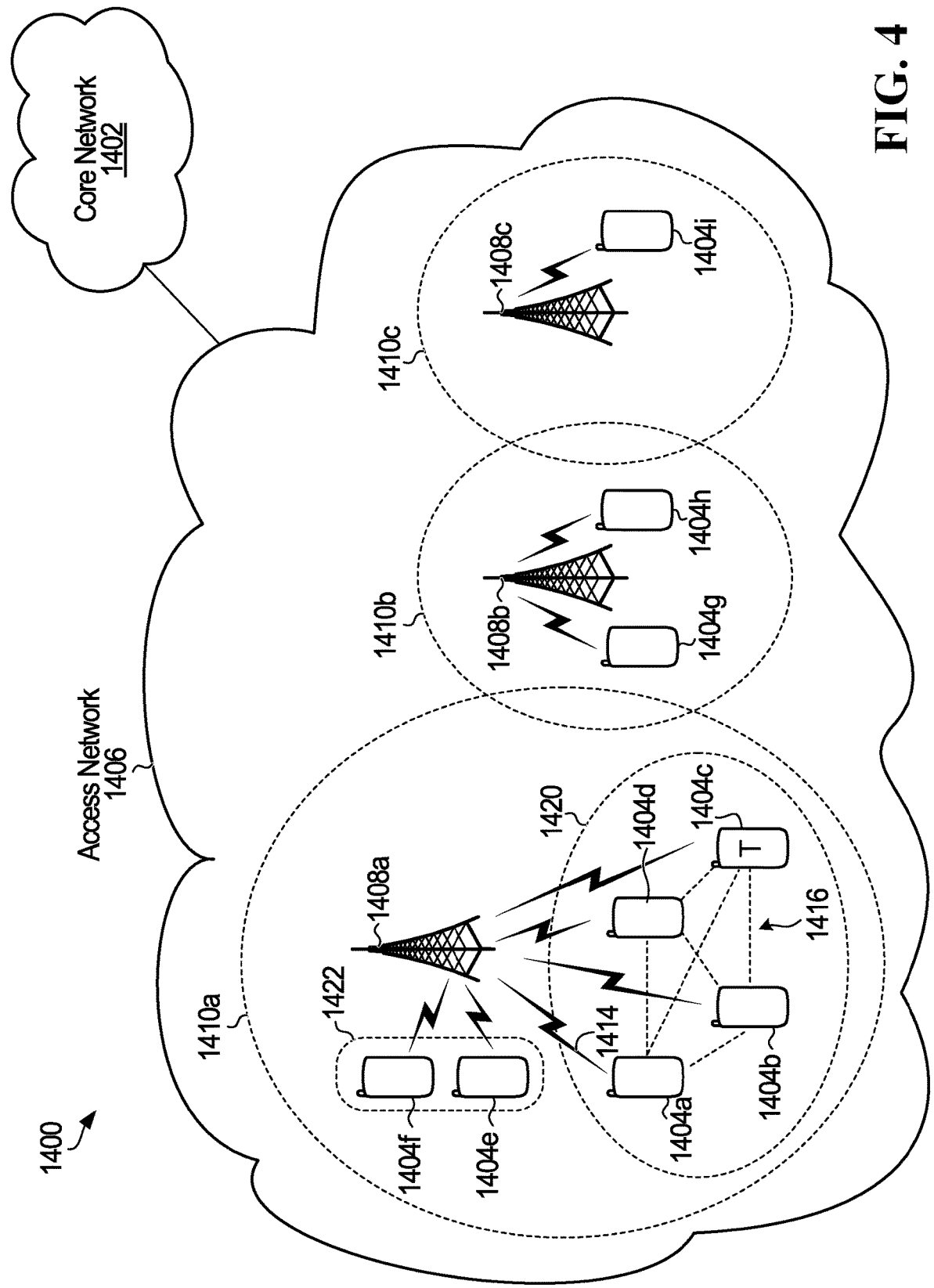
FIG. 4 is a block diagram illustrating an example of a telecommunications network according to one embodiment.

FIG. 4 is a block diagram illustrating an example of a telecommunications network 1400 according to one embodiment, for implementing any one or combination of two or more of the above described methods. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i. The access network 1406 could be an Evolved Universal Terrestrial Access (E-UTRA) network. As another example, the access network 1406 could be a cloud access network (C-RAN). The access network 1406 includes a plurality of BSs 1408a, 1408b, and 1408c. The BSs 1408a-c each provide a respective wireless coverage area 1410a, 1410b, and 1410c. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, or a remote radio head (RRH), depending upon the implementation.

In operation, the plurality of UEs 1404a-i access the telecommunications network 1400 using the access network 1406 by wirelessly communicating with one or more of the BSs 1408a-c.

UEs 1404a-d are in close proximity to each other. Although the UEs 1404a-d can each wirelessly communicate with the BS 1408a, they can also directly communicate with each other, as represented at 1416. The communications represented at 1416 are direct communications between UEs that do not go through an access network component, such as a BS. As shown in FIG. 4, UE to UE communications 1416 are directly between the UEs 1404a-d and are not routed through the BS 1408a, or any other part of the access network 1406. Communications 1416 may also be referred to as lateral communications. In embodiments disclosed herein, UE to UE communications use an SL channel and an SL air interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), and Wi-Fi.

By using the SL communications 1416, the UEs 1404a-d may be able to assist with wireless communications between the UEs 1404a-d and the BS 1408a. As one example, if UE 1404c fails to correctly decode a packet received from the BS 1408a, but if UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404a, 1404b, and/or 1404d. V2X communications as referenced herein are an example of SL communications.

The UEs 1404a-d form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group, i.e. address all other UEs within the UE group 1420. The UE group 1420 may form a logical or virtual device mesh in which the members of the UE group 1420 communicate amongst themselves using UE communications over an SL air interface, but the UE group 1420 as a whole acts as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408a, then that particular UE is referred to as the target UE. In the examples above, UE 1404c is being assisted and so is the TUE 1404c. The other UEs 1404a, 1404b, and 1404d in the group 1420 form a cooperation candidate set, which is a set of UEs that may cooperate to help the TUE 1404c. The subset of UEs in the cooperation candidate set that actually assist the target UE 1404c form a cooperation active set. The cooperation active set may be dynamically selected to assist the target UE 1404c. The UEs in the cooperation active set are referred to as cooperating UEs (CUEs). In UE group 1420, UEs 1404a, 1404b, and 1404d form the cooperation candidate set. If UEs 1404a and 1404b actually assist target UE 1404c, then UEs 1404a and 1404b form the cooperation active set and are the CUEs. As UEs 1404a-d move around, some may leave the UE group 1420 and/or other UEs may join the UE group 1420. Therefore, the cooperation candidate set may change over time, e.g., the cooperation candidate set may change semi-statically. The UE group 1420 may also be terminated by the network 1406, e.g., if the network determines that there is no longer a need or opportunity for the UE group 1420 to provide assistance in wireless communication between the BS 908a and members of the UE group 1420.

There may be more than one UE group. For example, UEs 1404e and 1404f in FIG. 4 form another UE group 1422.

Figure 5:
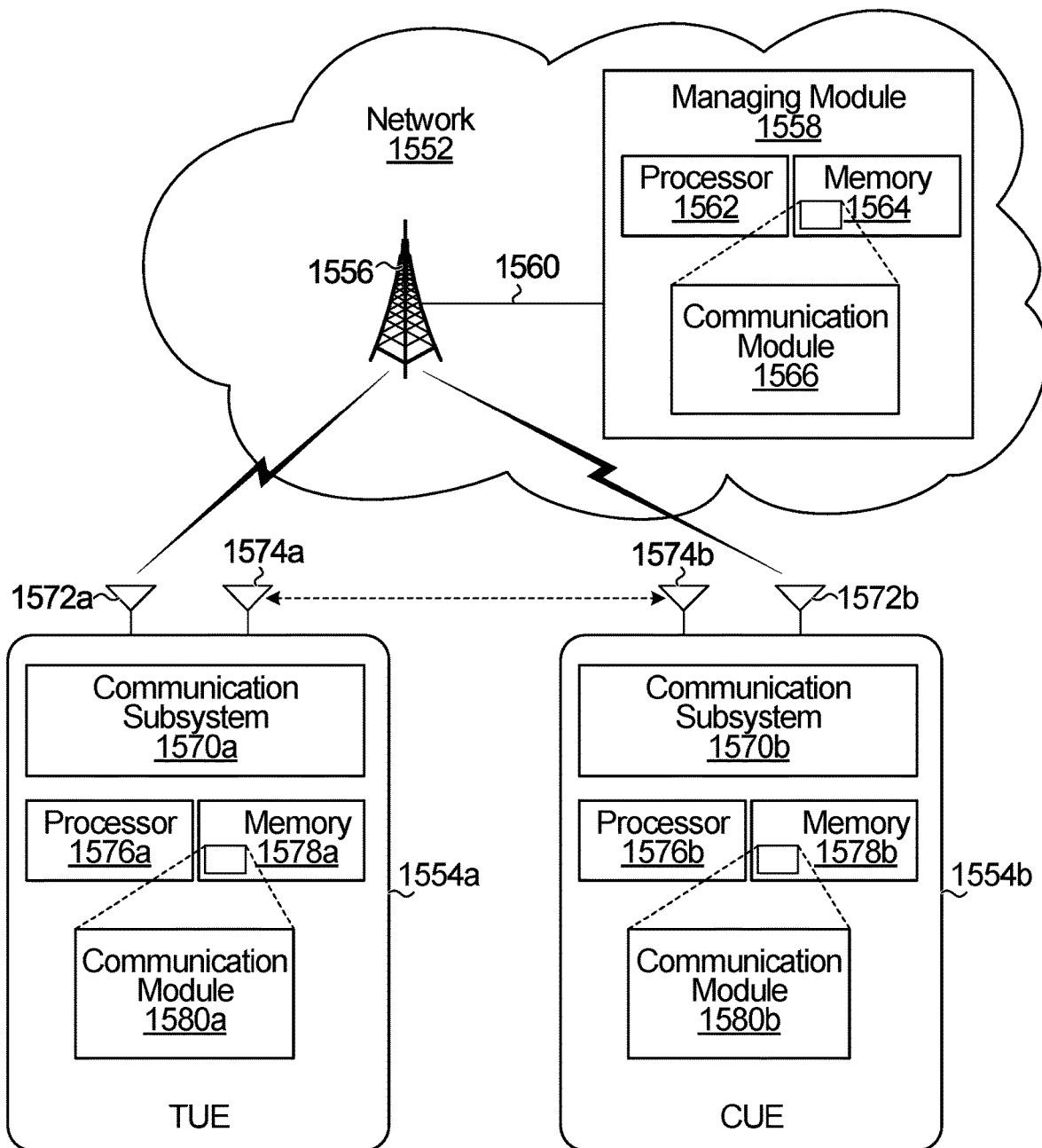
FIG. 5 is a block diagram illustrating an example of a network serving two UEs.

FIG. 5 is a block diagram illustrating an example of a network 1552 serving two UEs 1554a and 1554b, according to one embodiment. The network 1552 may be the access network 1406 from FIG. 4, and the two UEs 1554a and 1554b may be two of the four UEs 1404a-d in FIG. 7, or the UEs 1554a and 1554b may be UEs 1404e and 1404f in FIG. 4. However, more generally this need not be the case, which is why different reference numerals are used in FIG. 5.

The network 1552 includes a BS 1556 and a managing module 1558. The managing module 1558 instructs the BS 856 to perform actions. The managing module 858 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554a includes a communication subsystem 1570a, two antennas 1572a and 1574a, a processor 1576a, and a memory 1578a. The UE 1554a also includes a communication module 1580a. The communication module 1580a is implemented by the processor 1576a when the processor 1576a accesses and executes a series of instructions stored in the memory 1578a, the instructions defining the actions of the communication module 1580a. When the instructions are executed, the communication module 1580a causes the UE 1554a to perform the actions described herein in relation to establishing and participating in a UE group. Alternatively, the module 1580a may be implemented by dedicated circuitry, such as an ASIC or an FPGA.

The communication subsystem 1570a includes processing and transmit/receive circuitry for sending messages from and receiving messages at the UE 1554a. Although one communication subsystem 1570a is illustrated, the communication subsystem 1570a may be multiple communication subsystems. Antenna 1572a transmits wireless communication signals to, and receives wireless communications signals from, the BS 1556. Antenna 1574a transmits SL communication signals to, and receives SL communication signals from, other UEs, including UE 1554b. In some implementations there may not be two separate antennas 1572a and 1574a. A single antenna may be used. Alternatively, there may be several antennas, but not separated into antennas dedicated only to SL communication and antennas dedicated only to communicating with the BS 1556.

SL communications could be over Wi-Fi, in which case the antenna 1574a may be a Wi-Fi antenna. Alternatively, the SL communications could be over Bluetooth™, in which case the antenna 1574a may be a Bluetooth™ antenna. SL communications could also or instead be over licensed or unlicensed spectrum.

The UE 1554b includes the same components described above with respect to the UE 1554a. That is, UE 1554b includes communication subsystem 1570b, antennas 1572b and 1574b, processor 1576b, memory 1578b, and communication module 1580b.

The UE 1554a is designated as a target UE (TUE) and will therefore be called TUE 1554a. The UE 1554b is a cooperating UE and will therefore be called CUE 254b. The CUE 1554b may be able to assist with wireless communications between the BS 1556 and TUE 1554a if a UE group were to be established that included TUE 1554a and CUE 1554b. Other communication scenarios are also contemplated, in a V2X application, for example.

UE 1554a may be specifically chosen as the target UE by the network 1552. Alternatively, the UE 1554a may itself determine that it wants to be a target UE and inform the network 1552 by sending a message to the BS 1556. Example reasons why UE 1554a may choose or be selected by the network 1552 to be a target UE include: low wireless channel quality between the UE 1554a and the BS 1556, many packets to be communicated between the BS 1556 and the UE 1554a, and/or the presence of a cooperating UE that is a good candidate for helping with communications between the BS 1556 and the UE 1554a.

UE 1554a need not always stay a target UE. For example, UE 1554a may lose its status as a target UE once there is no longer a need or desire for assistance with wireless communications between UE 1554a and the BS 1556. UE 1554a may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 1554a acts only as a target UE, i.e., TUE 1554a, and the UE 1554b is a cooperating UE to the TUE 1554a, i.e., CUE 1554b.

FIGS. 4 and 5 illustrate systems in which embodiments could be implemented. In some embodiments, a UE includes a processor, such as 1576a, 1576b in FIG. 5, and a non-transitory computer readable storage medium, such as 1578a, 1578b in FIG. 5, storing programming for execution by the processor. A non-transitory computer readable storage medium could also or instead be provided separately, as a computer program product.

Figure 6:
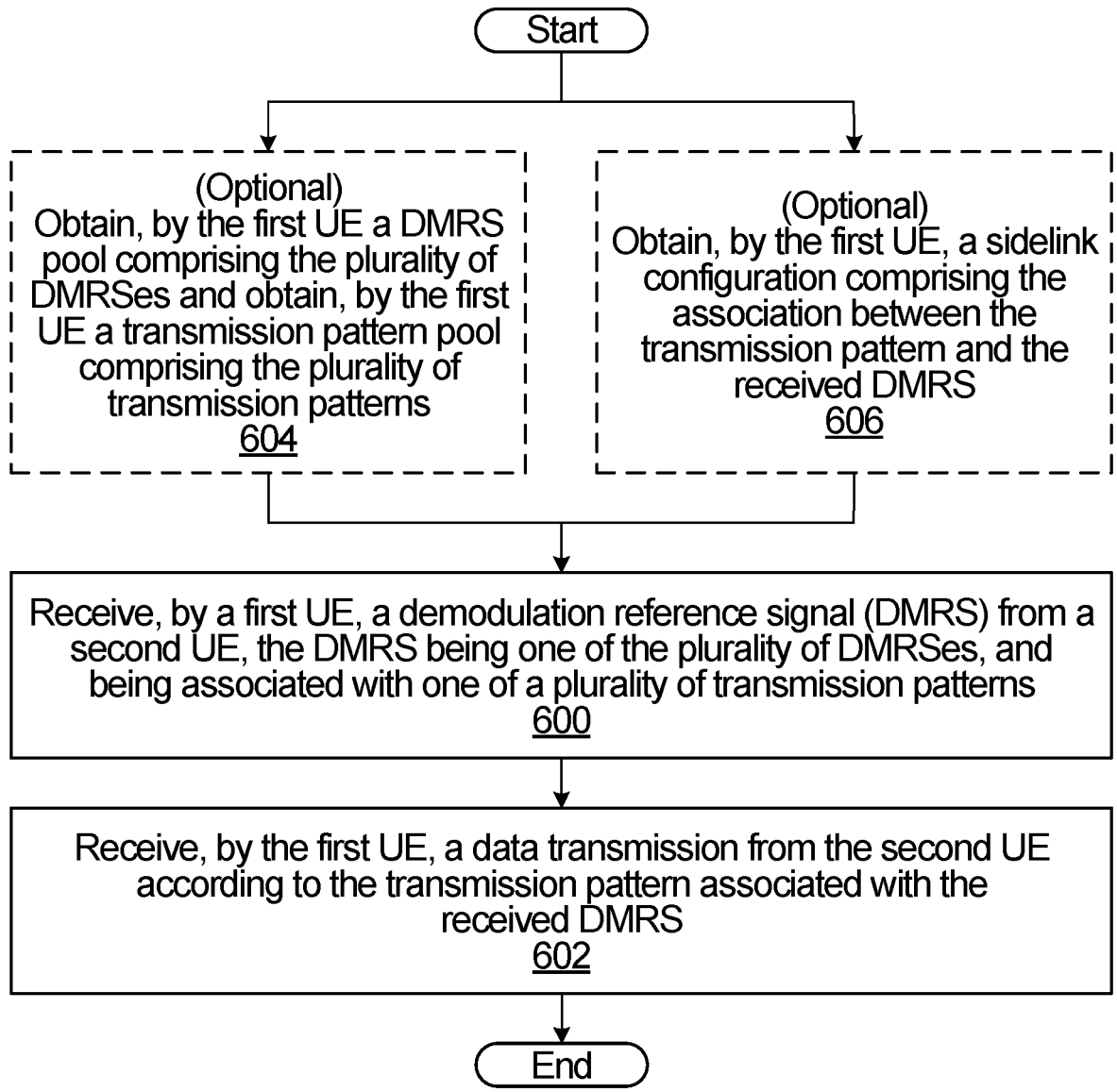
FIGS. 6, 7, 8, 9, 10, 11 and 12 are flowcharts of methods of wireless communication provided by embodiments of the disclosure.

Referring now to FIG. 6, shown is a flowchart of a method of wireless communication provided by an embodiment of the disclosure. Any of the modifications, options, additional features described herein can be applied together with this method. The method may, for example, be performed by one of the UE depicted in FIG. 4 or FIG. 5. The method involves:

receiving, by a first UE, a demodulation reference signal (DMRS) from a second UE, the DMRS being one of the plurality of DMRSes, and being associated with one of a plurality of transmission patterns at block 600; and receiving, by the first UE, a data transmission from the second UE according to the transmission pattern associated with the received DMRS at block 602.

Optionally, the method also involves one or both of blocks 604 and 606. Block 604 involves obtaining, by the first UE, a DMRS pool comprising the plurality of DMRSes and obtain by the first UE a transmission pattern pool comprising the plurality of transmission patterns. Block 606 involves obtaining, by the first UE, a sidelink configuration comprising an association between transmission pattern and received DMRS.

Figure 7:
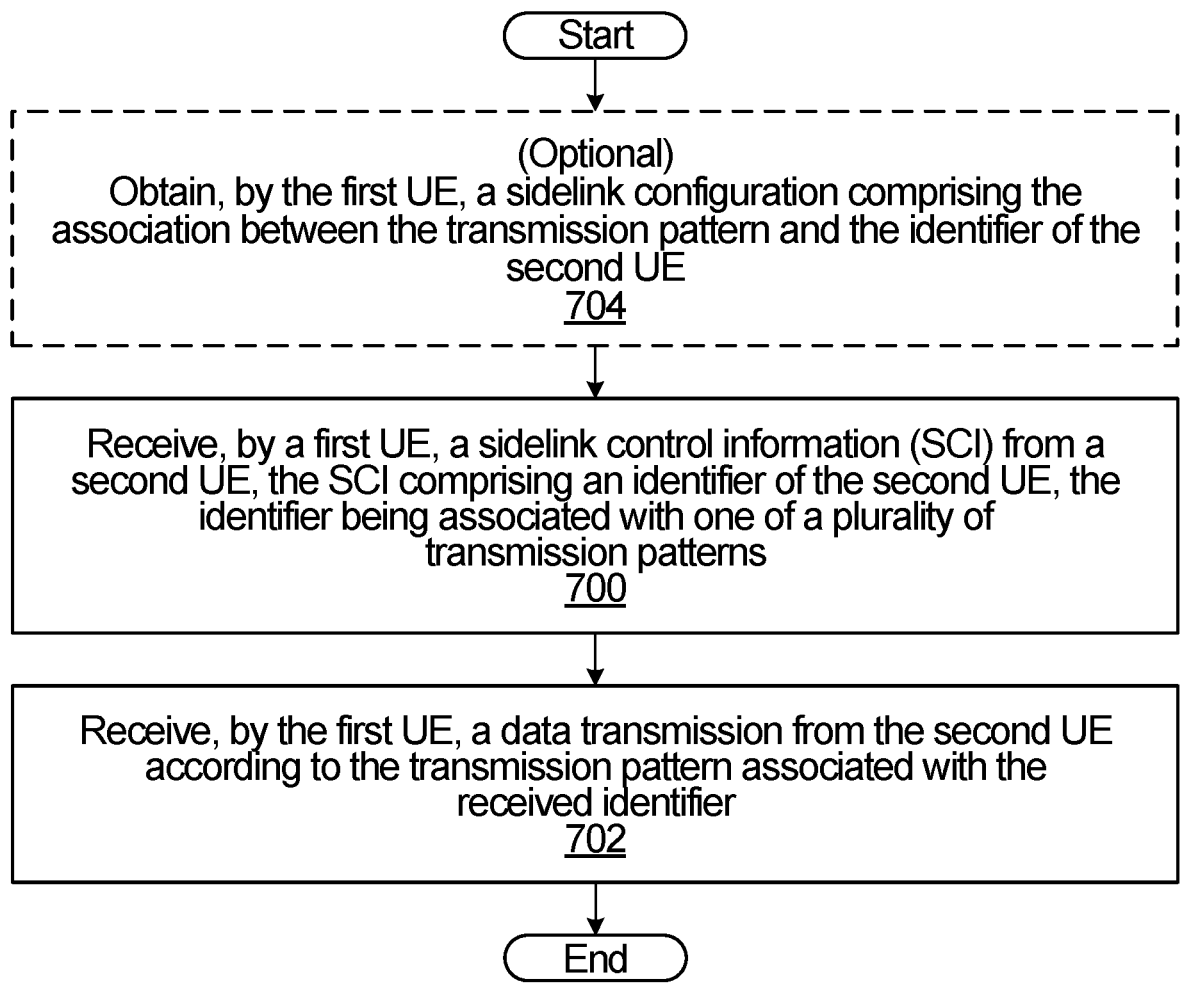

Referring now to FIG. 7, shown is a flowchart of a method of wireless communication provided by an embodiment of the disclosure. Any of the modifications, options, additional features described herein can be applied together with this method. The method may, for example, be performed by one of the UE depicted in FIG. 4 or FIG. 5. The method involves:

receiving, by a first UE, a sidelink control information (SCI) from a second UE, the SCI comprising an identifier of the second UE, the identifier being associated with one of a plurality of transmission patterns at block 700; and receiving, by the first UE, a data transmission from the second UE according to the transmission pattern associated with the received identifier at block 702.

Optionally, the method also involves obtaining, by the first UE, a sidelink configuration comprising the association between the transmission pattern and the identifier of the second UE at block 704

Figure 8:
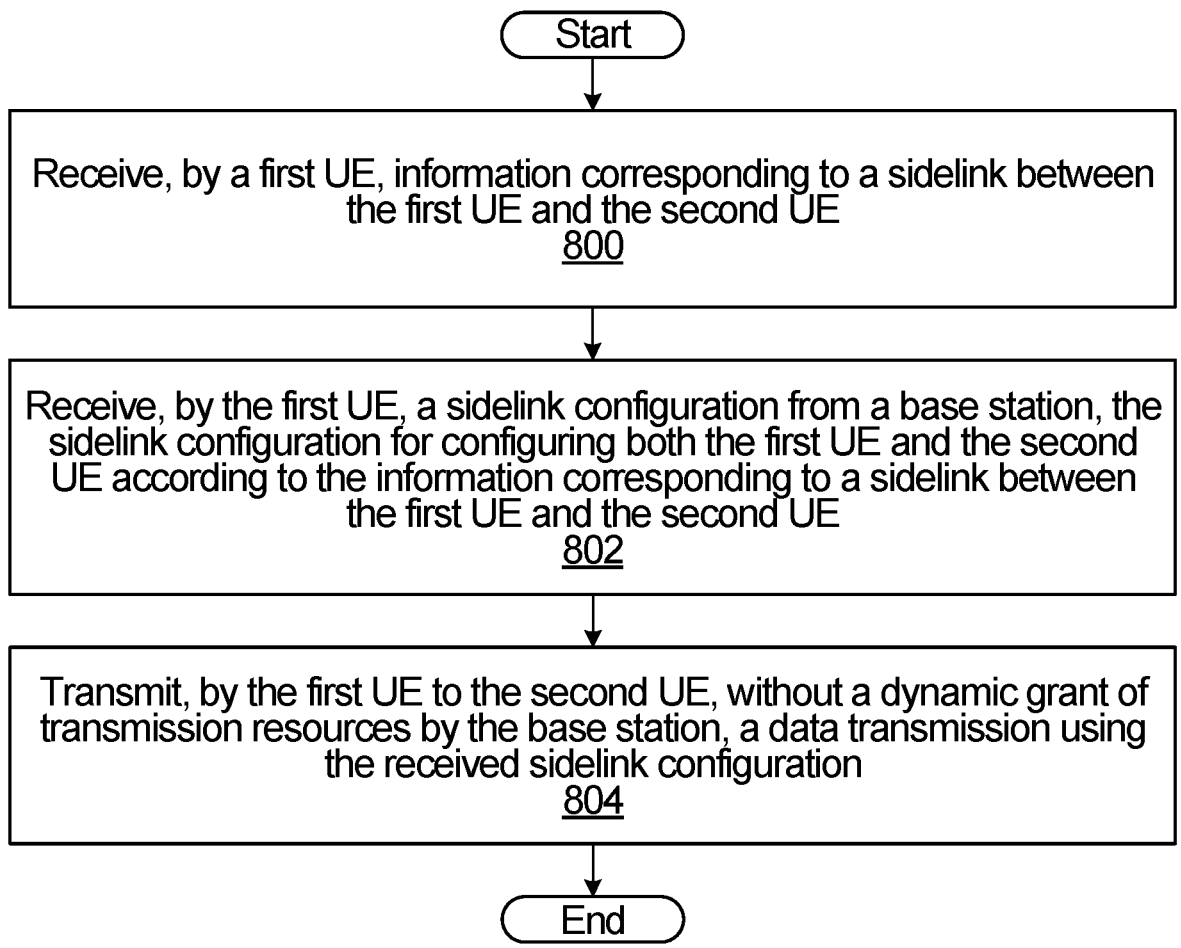

Referring now to FIG. 8, shown is a flowchart of a method of wireless communication provided by an embodiment of the disclosure. Any of the modifications, options, additional features described herein can be applied together with this method. The method may, for example, be performed by one of the UE depicted in FIG. 4 or FIG. 5. The method involves
receiving, by a first UE, sidelink information between the first UE and the second UE at block 800;
receiving, by the first UE, a sidelink configuration from a base station, the sidelink configuration for configuring both the first UE and the second UE according to the sidelink information at block 802; and
transmitting, by the first UE to the second UE, without a dynamic grant of transmission resources by the base station, a data transmission using the received sidelink configuration at block 804.

Figure 9:
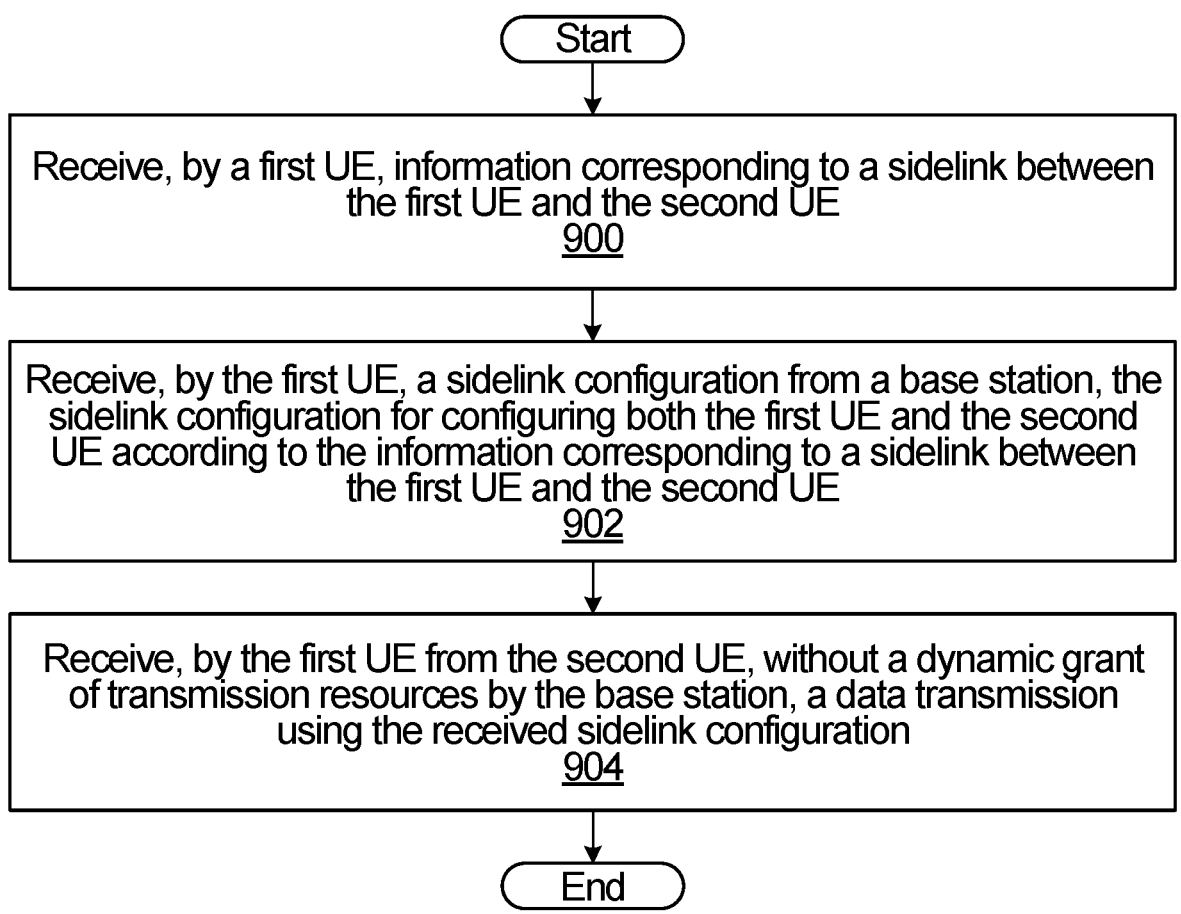

Referring now to FIG. 9, shown is a flowchart of a method of wireless communication provided by an embodiment of the disclosure. Any of the modifications, options, additional features described herein can be applied together with this method. The method may, for example, be performed by one of the UE depicted in FIG. 4 or FIG. 5. The method involves:
receiving, by a first UE, sidelink information between the first UE and the second UE at block 900;
receiving, by the first UE, a sidelink configuration from a base station, the sidelink configuration for configuring both the first UE and the second UE according to the sidelink information at block 902; and
receiving, by the first UE from the second UE, without a dynamic grant of transmission resources by the base station, a data transmission using the received sidelink configuration at block 904.

Further details of other options are described in Applicant's Application No. 62/791,722 filed Jan. 11, 2019 and 62/755,392 filed Nov. 2, 2018, both of which is hereby incorporated by reference in its entirety.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
receiving, by a first user equipment (UE), a UE-specific radio resource control (RRC) signal for indicating a resource pool configuration and a sidelink (SL) configured grant (CG) configuration, the resource pool configuration comprising an indication of a plurality of transmission resources available for SL transmissions, and the SL CG configuration comprising an indication of a transmission resource from the plurality of transmission resources, the transmission resource for communicating a SL CG transmission between the first UE and a second UE, wherein the UE-specific RRC signal further indicates a modulation and coding scheme (MCS) pool indicating a subset of MCS values from a predefined MCS table that can be used for SL CG transmissions; and
transmitting, by the first UE, the SL CG transmission to the second UE using the transmission resource indicated by the SL CG configuration in the UE-specific RRC signal and an MCS from the MCS pool, without the first UE receiving, in a dynamically-signaled control signal, a grant of the transmission resource for communicating the SL CG transmission.

2. The method of claim 1, wherein the transmission resource for communicating the SL CG transmission comprises a SL control channel resource and a SL data channel resource, and wherein the transmitting the SL CG transmission comprises:
transmitting SL control information (SCI) using the SL control channel resource and transmitting SL data using the SL data channel resource.

3. The method of claim 2, wherein the SCI further comprises an indication of a SL transmission resource and a partial version of a destination identifier, wherein the destination identifier further includes in a MAC header of the SL CG transmission, and wherein the transmitting the SL CG transmission further comprises:
transmitting the SL CG transmission using the SL transmission resource indicated by the SCI.

4. The method of claim 1, wherein the SL CG configuration further comprises an indication of a periodicity of the transmission resource.

5. The method of claim 1, wherein the resource pool configuration further comprises an indication of a number of resource blocks (RBs) in a frequency sub-channel of the transmission resource.

6. The method of claim 1, wherein the SL CG configuration is a first SL CG configuration, wherein the UE-specific RRC signal further indicates a second SL CG configuration, and wherein the method further comprises:
transmitting, by the first UE, a second SL CG transmission to the second UE or a third UE using a second transmission resource indicated by the second SL CG configuration, without the first UE receiving, in a second dynamically-signaled control signal, a grant of the second transmission resource.

7. The method of claim 1, wherein the SL CG configuration further comprises an indication of a feedback channel parameter associated with the transmission resource.

8. The method of claim 1, wherein the resource pool configuration is a first resource pool configuration, wherein the SL CG configuration is a first SL CG configuration, wherein the UE-specific RRC signal further indicates a second resource pool configuration and a second SL CG configuration, and wherein the second resource pool configuration comprises an indication of a second plurality of transmission resources available for second SL transmissions, and the second SL CG configuration comprises an indication of a second transmission resource from the second plurality of transmission resources.

9. A method comprising:
transmitting, by a base station, a user equipment (UE)-specific radio resource control (RRC) signal to a first UE, the UE-specific RRC signal for indicating a resource pool configuration and a sidelink (SL) configured grant (CG) configuration, the resource pool configuration comprising an indication of a plurality of transmission resources available for SL transmissions, and the SL CG configuration comprising an indication of a transmission resource from the plurality of transmission resources, the transmission resource for communicating a SL CG transmission between the first UE and a second UE without the first UE receiving, in a dynamically-signaled control signal, a grant of the transmission resource for communicating the SL CG transmission, wherein the UE-specific RRC signal further indicates a modulation and coding scheme (MCS) pool indicating a subset of MCS values from a predefined MCS table that can be used for SL CG transmissions, the MCS pool including an MCS for communicating the SL CG transmission between the first UE and the second UE.

10. The method of claim 9, wherein the transmission resource for communicating the SL CG transmission comprises a SL control channel resource and a SL data channel resource, and wherein the transmission resource for communicating the SL CG transmission between the first UE and the second UE is for transmitting SL control information using the SL control channel resource and transmitting SL data using the SL data channel resource.

11. The method of claim 9, wherein the SL CG configuration further comprises an indication of a periodicity of the transmission resource.

12. The method of claim 9, wherein the resource pool configuration further comprises an indication of a number of resource blocks (RBs) in a frequency sub-channel of the transmission resource.

13. The method of claim 9, wherein the SL CG configuration is a first SL CG configuration, and wherein the UE-specific RRC signal further indicates a second SL CG configuration for use in transmitting, by the first UE, a second SL CG transmission to the second UE or a third UE using a second transmission resource indicated by the second SL CG configuration, without the first UE receiving, in a second dynamically-signaled control signal, a grant of the second transmission resource.

14. The method of claim 9, wherein the SL CG configuration further comprises an indication of a feedback channel parameter associated with the transmission resource.

15. A method comprising:

receiving, by a first user equipment (UE), a sidelink (SL) configured grant (CG) transmission from a second UE, using a transmission resource indicated by a SL CG configuration, without the second UE receiving, in a dynamically-signaled control signal, a grant of the transmission resource for communicating the SL CG transmission, wherein the SL CG configuration is included in a UE-specific radio resource control (RRC) signal for indicating a resource pool configuration, the resource pool configuration comprising an indication of a plurality of transmission resources available for SL transmissions, and the SL CG configuration indicates the transmission resource from the plurality of transmission resources, wherein the UE-specific RRC signal further indicates a modulation and coding scheme (MCS) pool indicating a subset of MCS values from a predefined MCS table that can be used for SL CG transmissions, the MCS pool including an MCS for communicating the SL CG transmission.

16. A method comprising:

transmitting, by a first user equipment (UE), a sidelink (SL) control information (SCI) to a second UE identified by a destination identifier, the SL control information comprising an indication of a SL transmission resource and a partial version of the destination identifier identifying the second UE, the partial version of the destination identifier identifying the second UE without including all of the version of the destination identifier; and transmitting, by the first UE, a SL transmission to the second UE using the SL transmission resource indicated by the SL control information.

17. The method of claim 16, wherein the SL transmission is a SL configured grant (CG) transmission.

18. The method of claim 16, wherein the destination identifier is further included in a MAC header of the SL transmission.

19. A user equipment (UE) comprising:
at least one processor; and
a non-transitory computer readable storage medium storing programming for execution by the at least one processor, the programming including instructions to:
receive a UE-specific radio resource control (RRC) signal for indicating a resource pool configuration and a sidelink (SL) configured grant (CG) configuration, the resource pool configuration comprising an indication of a plurality of transmission resources available for SL transmissions, and the SL CG configuration comprising an indication of a transmission resource from the plurality of transmission resources, the transmission resource for communicating a SL CG transmission between the UE and a second UE, wherein the UE-specific RRC signal further indicates a modulation and coding scheme (MCS) pool indicating a subset of MCS values from a predefined MCS table that can be used for SL CG transmissions; and
transmit the SL CG transmission to the second UE using the transmission resource indicated by the SL CG configuration in the UE-specific RRC signal and an MCS from the MCS pool, without the UE receiving, in a dynamically-signaled control signal, a grant of the transmission resource for communicating the SL CG transmission.

20. The UE of claim 19, wherein the transmission resource for communicating the SL CG transmission comprises a SL control channel resource and a SL data channel resource, and wherein the instructions to transmit the SL CG transmission comprise instructions to:
transmit SL control information using the SL control channel resource and transmitting SL data using the SL data channel resource.

21. The UE of claim 19, wherein the SL CG configuration further comprises an indication of a periodicity of the transmission resource.

22. The UE of claim 19, wherein the resource pool configuration further comprises an indication of a number of resource blocks (RBs) in a frequency sub-channel of the transmission resource.

23. The UE of claim 19, wherein the SL CG configuration is a first SL CG configuration, and wherein the UE-specific RRC signal further indicates a second SL CG configuration, the programming further including instructions to:
transmit a second SL CG transmission to the second UE or a third UE using a second transmission resource indicated by the second SL CG configuration, without the UE receiving, in a second dynamically-signaled control signal, a grant of the second transmission resource.

24. The user equipment of claim 19, wherein the SL CG configuration further comprises an indication of a feedback channel parameter associated with the transmission resource.

25. A base station comprising:
at least one processor; and
a non-transitory computer readable storage medium storing programming for execution by the at least one processor, the programming including instructions to:
    transmit a user equipment (UE)-specific radio resource control (RRC) signal to a first UE, the UE-specific RRC signal for indicating a resource pool configuration and a sidelink (SL) configured grant (CG) configuration, the resource pool configuration comprising an indication of a plurality of transmission resources available for SL transmissions, and the SL CG configuration comprising an indication of a transmission resource from the plurality of transmission resources, the transmission resource for communicating a SL CG transmission between the first UE and a second UE without the first UE receiving, in a dynamically-signaled control signal, a grant of the transmission resource for communicating the SL CG transmission,
    wherein the UE-specific RRC signal further indicates a modulation and coding scheme (MCS) pool indicating a subset of MCS values from a predefined MCS table that can be used for SL CG transmissions, the MCS pool including an MCS for communicating the SL CG transmission between the first UE and the second UE.

26. The base station of claim 25, wherein the transmission resource for communicating the SL CG transmission comprises a SL control channel resource and a SL data channel resource, and wherein the transmission resource for communicating the SL CG transmission between the first UE and the second UE is for transmitting SL control information using the SL control channel resource and transmitting SL data using the SL data channel resource.

27. The base station of claim 25, wherein the SL CG configuration further comprises an indication of a periodicity of the transmission resource.

28. The base station of claim 25, wherein the resource pool configuration further comprises an indication of a number of resource blocks (RBs) in a frequency sub-channel of the transmission resource.

29. The base station of claim 25, wherein the SL CG configuration is a first SL CG configuration, and wherein the UE-specific RRC signal further indicates a second SL CG configuration for use in transmitting, by the first UE, a second SL CG transmission to the second UE or a third UE using a second transmission resource indicated by the second SL CG configuration, without the first UE receiving, in a second dynamically-signaled control signal, a grant of the second transmission resource.

30. The base station of claim 25, wherein the SL CG configuration further comprises an indication of a feedback channel parameter associated with the transmission resource.

31. A user equipment (UE) comprising:
at least one processor; and
a non-transitory computer readable storage medium storing programming for execution by the at least one processor, the programming including instructions to:
    receive a sidelink (SL) configured grant (CG) transmission from a second UE, using a transmission resource indicated by a SL CG configuration, without the second UE receiving, in a dynamically-signaled control signal, a grant of the transmission resource for communicating the SL CG transmission, wherein the SL CG configuration is included in a UE-specific radio resource control (RRC) signal for indicating a resource pool configuration, the resource pool configuration comprising an indication of a plurality of transmission resources available for SL transmissions, and the SL CG configuration indicates the transmission resource from the plurality of transmission resources,
    wherein the UE-specific RRC signal further indicates a modulation and coding scheme (MCS) pool indicating a subset of MCS values from a predefined MCS table that can be used for SL CG transmissions, the MCS pool including an MCS for communicating the SL CG transmission.

32. A user equipment (UE) comprising:
at least one processor; and
a non-transitory computer readable storage medium storing programming for execution by the at least one processor, the programming including instructions to:
    transmit a sidelink (SL) control information (SCI) to a second UE identified by a destination identifier, the SL control information comprising an indication of a SL transmission resource and a partial version of the destination identifier identifying the second UE, the partial version of the destination identifier identifying the second UE without including all of the version of the destination identifier; and
    transmit a SL transmission to the second UE using the SL transmission resource indicated by the SL control information.

33. The UE of claim 32, wherein the SL transmission is a SL configured grant (CG) transmission.

34. The UE of claim 32, wherein the destination identifier is further included in a MAC header of the SL transmission.

* * * * *